(12) United States Patent
Revital et al.

(10) Patent No.: US 7,995,603 B2
(45) Date of Patent: Aug. 9, 2011

(54) SECURE DIGITAL CONTENT DELIVERY SYSTEM AND METHOD OVER A BROADCAST NETWORK

(75) Inventors: Dan Revital, Jerusalem (IL); Steve Epstein, Hashmonaim (IL); Yossi Tsuria, Jerusalem (IL); Arnold Zucker, Hashmonaim (IL); Steven Simkin, Jerusalem (IL)

(73) Assignee: NDS Limited, Middlesex (GB)

( * ) Notice: Subject to any disclaimer, the term of this patent is extended or adjusted under 35 U.S.C. 154(b) by 2318 days.

(21) Appl. No.: 10/258,497

(22) PCT Filed: May 22, 2001

(86) PCT No.: PCT/IL01/00469
§ 371 (c)(1),
(2), (4) Date: Mar. 11, 2003

(87) PCT Pub. No.: WO01/91465
PCT Pub. Date: Nov. 29, 2001

(65) Prior Publication Data
US 2004/0101138 A1    May 27, 2004

Related U.S. Application Data

(60) Provisional application No. 60/206,140, filed on May 22, 2000.

(51) Int. Cl.
*H04J 3/26* (2006.01)

(52) U.S. Cl. ........ 370/432; 370/345; 370/522; 380/210; 380/239; 380/270; 380/271; 380/278; 380/200; 713/160; 713/154; 713/163; 713/182; 713/277; 713/151; 713/171; 726/12; 709/219; 709/227; 709/201; 725/32; 725/114; 725/144

(58) Field of Classification Search .................. 380/239
See application file for complete search history.

(56) References Cited

U.S. PATENT DOCUMENTS
4,868,866 A * 9/1989 Williams, Jr. .................. 380/49
(Continued)

FOREIGN PATENT DOCUMENTS
EP    0876029    * 11/1998
(Continued)

OTHER PUBLICATIONS

"Functional Model of a Conditional Access System", *EBU Review-Technical*, (1995) pp. 64-77.*

(Continued)

*Primary Examiner* — Nathan Flynn
*Assistant Examiner* — Bryan Wright
(74) *Attorney, Agent, or Firm* — Ladas & Parry LLP

(57) ABSTRACT

A system and a method for secure distribution of digital media content through a packet-based network such as the Internet. The security of the present invention does not require one-to-one key exchange, but rather enables keys, and/or information required in order to build the key, to be broadcast through the packet-based network. The digital media content is then also preferably broadcast, but cannot be accessed without the proper key. However, preferably only authorized end-user devices are able to access the digital media content, by receiving and/or being able to access the proper key. Thus, the present invention is useful for other types of networks in which digital media content is more easily broadcast rather than unicast, in addition to packet-based networks.

66 Claims, 6 Drawing Sheets

U.S. PATENT DOCUMENTS

| | | | | | |
|---|---|---|---|---|---|
| 5,029,208 | A | * | 7/1991 | Tanaka | 380/21 |
| 5,282,249 | A | * | 1/1994 | Cohen et al. | 380/23 |
| 5,420,866 | A | * | 5/1995 | Wasilewski | 370/110.1 |
| 5,481,609 | A | * | 1/1996 | Cohen et al. | 380/16 |
| 5,748,736 | A | * | 5/1998 | Mittra | 380/21 |
| 5,761,306 | A | * | 6/1998 | Lewis | 380/21 |
| 5,778,187 | A | * | 7/1998 | Monteiro et al. | 395/200.61 |
| 5,784,463 | A | * | 7/1998 | Chen et al. | 380/21 |
| 6,002,768 | A | | 12/1999 | Albanese et al. | 380/25 |
| 6,026,167 | A | * | 2/2000 | Aziz | 380/28 |
| 6,049,878 | A | * | 4/2000 | Caronni et al. | 713/201 |
| 6,061,791 | A | | 5/2000 | Moreau | 713/171 |
| 6,091,818 | A | * | 7/2000 | Campinos et al. | 713/155 |
| 6,108,706 | A | | 8/2000 | Birdwell et al. | 709/229 |
| 6,178,242 | B1 | | 1/2001 | Tsuria | 380/201 |
| 6,195,751 | B1 | | 2/2001 | Caronni et al. | 713/163 |
| 6,351,467 | B1 | * | 2/2002 | Dillon | 370/432 |
| 6,567,929 | B1 | * | 5/2003 | Bhagavath et al. | 714/18 |
| 6,629,243 | B1 | * | 9/2003 | Kleinman et al. | 713/163 |
| 6,792,615 | B1 | * | 9/2004 | Rowe et al. | 725/37 |
| 6,928,656 | B1 | * | 8/2005 | Addington | 725/111 |
| 2001/0047474 | A1 | * | 11/2001 | Takagi et al. | 713/151 |
| 2002/0035730 | A1 | * | 3/2002 | Ollikainen et al. | 725/93 |

FOREIGN PATENT DOCUMENTS

| | | | |
|---|---|---|---|
| EP | 0858184 | * | 8/1999 |
| GB | 2344978 | | 6/2000 |
| GB | 2353682 | * | 2/2001 |
| WO | 9909743 | * | 2/1999 |
| WO | 0191465 | * | 11/2001 |

OTHER PUBLICATIONS

Guillemot, C. et al. "Integrating MPEG-4 into the Internet", Proceedings of the European Conference on Multimedia Applications, Services and Techniques, (1999) pp. 181-196.*
Johnson, V. et al. "How IP Multicast Works", *IP Multicast Initiative (IPMI)*—Stardust.com, Inc. (1997).
Johnson, V. et al. "Introduction to IP Multicast Routing", *IP Multicast Initiative (IPMI)*—Stardust.com, Inc. (1997).
Johnson, V. et al. Higher Level Protocols Used with IP Multicast, *IP Multicast Initiative*—Stardust.com, Inc. (1997).
Quinn, B. "IP Multicast Applications: Challenges and Solutions", *IP Multicast Initiative*, (1998) pp. 1-18.
Hardjono, T. et al. "Secure IP Multicast: Problem areas, Framework, and Building Blocks", Internet Research Task Force, (2000) pp. 1-21.
Hardjono, T. et al. "A Framework for Group Key Management for Multicast Security", Internet Engineering Task Force, (2000) pp. 1-23.
Wallner, D. et al. "Key Management for Multicast: Issues and Architectures", *The Internet Society*, (1999), pp. 1-23.
Harney, H. et al. "Group Key Management Protocol (GKMP) Architecture", Network Working Group, RFC2094 (1997).
Harney, H. et al. Group Key Management Protocol (GKMP) Specification, Network Working Group, RFC2093 (1997), pp. 1-22.
Harney, H. et al. "Group Secure Association Key Management Protocol", Sparta, Inc., *The Internet Society*, (2000) pp. 1-50.
Ballardie, A. "Scalable Multicast Key Distribution", Network Working Group, RFC1949, (1996).
Rodeh, O. et al. "Optimized Group Rekey for Group Communications Systems".
Canetti, R. et al. "A taxonomy of multicast security issues", Internet draft, (2000), pp. 1-18.
Bellovin, S.M. "Problem Areas for the IP Security Protocols", *Proceedings of the Sixth USENIX UNIX Security Symposium*, San Jose, (1996).
Frankel, S. et al. "The AES Cipher Algorithm and Its Use with IPSEc", Internet Draft, *IETF Internet Protocol Security Working Group, The Internet Society*, (1998), pp. 1-17.
Kent, S. "IP Encapsulating Security Payload (ESP)", *The Internet Society*, (1998), pp. 1-22.
Kent, S. "Security Architecture for the Internet Protocol", *The Internet Society*, (1998), pp. 1-66.
Canetti, R. et al. "An Architecture for Secure Internet Multicast", IBM, draft-ietf-ipsec-sec-mcast-arch-00.txt.
Rogaway, P. "Problems with Proposed IP Cryptography", (1995) pp. 1-12.
Mittra, S. "Iolus: A Framework for Scalable Secure Multicasting", Proceedings of the ACM SIGCOMM 1997, *The Association for Computing Machinery, Inc.*, (1997), pp. 1-12.
Ming, D. "Techniques for multicast group key update", Email message received on SmuG List, (2000).
Kleinmann, A. "Scenarios and Requirements for Business-Oriented Multicast Security", IRTF Secure Multicast Research Group, (1988), pp. 1-12.
European Examination Report Dated Oct. 29, 2010 in EP Application No. 01 936 756.4.

* cited by examiner

SECURE DIGITAL CONTENT DELIVERY SYSTEM AND METHOD OVER A BROADCAST NETWORK

This application claims the benefit of U.S. Provisional Application No. 60/206,140 filed on May 22, 2000.

FIELD OF THE INVENTION

The present invention relates to a system and a method for digital content delivery, and in particular, to such a system and method in which the digital content is broadcast and/or multicast securely through a broadcast network, such as a packet-based network and/or IP network.

BACKGROUND OF THE INVENTION

Digital media content can easily and efficiently be delivered through any type of suitable network, although typically such digital content has been delivered through cable and/or satellite networks as broadcast digital content. However, in order for digital content to be fully effectively delivered to users, the basis for secure delivery needs to be provided. In particular, if payment is required, the digital content should be secure against theft, such that only authorized users can retrieve and display the digital content. At the same time, the content also should be delivered in an efficient manner, for example by enabling the secure delivery to be performed efficiently, without hindering or otherwise reducing the performance of the delivery mechanism itself, such as broadcast and/or multicast, for example.

One attempt to provide such effective mechanisms is described in U.S. Pat. Nos. 5,282,249 and 5,481,609, both to Cohen et al., which are hereby incorporated by reference as if fully set forth herein. The disclosed system enables a signal containing media content to be broadcast widely, yet only to be played back or otherwise displayed by authorized users. This signal could contain a television program for example. The signal is scrambled, such that the authorized users are able to unscramble the signal and play back or otherwise display the media content only with the proper security device, such as a smart card for example. Thus, widely received media content is still protected from access by unauthorized users.

Scrambled television data streams described in the Cohen et al patents comprise both scrambled data representing television signals and coded control messages, also known as ECMs (Entitlement Control Messages). The ECMs of Cohen et al comprise, in a coded form, data necessary for generating a control word (CW) which may be used to descramble the scrambled data representing television signals. An ECM is also termed a control word packet or CWP.

Data necessary for generating a control word is known in the background art to take many different forms and may include, in general, at least any of the following: a control word; an encrypted control word packet which is intended to be decrypted before use; and a seed to a generating function such as, for example, a one-way function which generates the control word upon input of the seed. Throughout the present specification and claims the terms "control word generating information" and "CW generating information" are used interchangeably to designate data necessary for generating a control word in any appropriate form, as described above.

Another attempted solution is described in published European Patent Application No. EP 0858184 and in corresponding U.S. Pat. No. 6,178,242, which disclose a digital recording protection system and which are hereby incorporated by reference as if fully set forth herein. The disclosed system enables the digital content to be sent in a digitally scrambled format, such that the digital content cannot be read and/or displayed without a key. The key is obtained from a control message, which is only sent to authorized users. Preferably, the key is obtained from coded information contained within the Entitlement Control Message, or ECM, for generating a control word associated with the ECM. Thus, only authorized users are able to correctly read and/or display the digital content.

In addition, the system and method described in European Patent Application No. EP 0858184 enable the authorized user to record and playback or otherwise display the digital content, while preventing the user from producing and distributing multiple playable copies of the digital content to other, non-authorized users. Therefore, the authorized user is able to fully use and enjoy the digital content, while the content itself is still protected from unauthorized use.

As described in European Patent Application No. EP 0858184, and as shown in background art FIG. 1 taken from this Application, such a system includes a media device 100, such as a television set, for playing the digital content, such as a television program for example. Media device 100 is connected to an integrated receiver-decoder (IRD) 110, for receiving and decoding the digitally scrambled digital content. The system also features a removable security element 120, such as a smart card for example, for providing control words for unscrambling, or otherwise rendering into a clear format, the digitally scrambled digital content by IRD 110. In addition, the system features a digital VCR 130 for communicating with media device 100 and IRD 110 Digital VCR 130 is able to record the digital content for later playback and/or display by media device 100.

IRD 110 receives digitally scrambled digital content which features a plurality of ECMs, each of which is associated with, and is typically followed by, a digitally scrambled digital data segment, containing the actual digital content. Each ECM includes coded information which can be used to generate a control word for unscrambling the associated digitally scrambled digital data segment. Typically, removable security element 120 generates the control word. IRD 110 is then able to unscramble the digitally scrambled digital content, for example for being played by media device 100.

Background art FIG. 2, also taken from European Patent Application No. EP 0858184, is a flow diagram illustrating the production of the digitally scrambled digital content. As shown, the digitally scrambled digital content is produced as an SDDS (digitally scrambled digital data stream) 140, featuring a plurality of ECMs such as an nth ECM 145, and a plurality of associated SDSEGs such as an nth SDSEG (digitally scrambled digital data segment) 150 which is associated with nth ECM 145. IRD 110 of FIG. 1, in cooperation with removable security element 120, is able to use SDDS 140 in order to form a recording SDDS 165. Recording SDDS 165 is produced with the addition of a TECM (transformed ECM) key, which is permanently associated with the system of FIG. 1, even if removable security element 120 is changed, replaced or exchanged, for example. This TECM key is used to make a plurality of TECMs, shown as nth TECM 175, from the control words of the ECMs. Thus, a system which did not feature the correct TECM key could not unscramble the recording SDDS 165 for playing back or otherwise displaying the digital content, while the authorized user is always able to play back or otherwise display the recorded digital content as long as the TECM key is available.

All of these background art references describe mechanisms for the secure delivery of content which are quite useful for such networks as cable and/or satellite networks. However, these references are less useful for packet-based networks, such as the Internet for example, as well as for other types of IP networks. Packet-based networks are typically not dedicated networks for the delivery of particular types of digital media content. Certainly, many different types of content are delivered through the Internet. Furthermore, the Internet is an inherently open, insecure conduit for digital content, as it is widely accessible. The general accessibility of the Internet is also quite useful, since digital media content could be delivered to many different users, internationally, easily and at relatively low cost. Unfortunately, the above-referenced background art references do not teach or suggest a mechanism for secure delivery of digital media content through a packet-based network, particularly for selected, targeted digital media content.

Furthermore, encryption for media content which is transmitted according to such formats and standards as MPEG (Motion Picture Expert Group) is handled at the PID level, such that only 13 bits of information are provided, and such that decryption and re-encryption of the data would be required when transmitted across networks. Such a small amount of information is not sufficient for both encrypting the digital media content and for identifying those devices which are permitted to decrypt and access the content. The further requirement for encryption/decryption when crossing networks is also a disadvantage, since encryption of data which is transmitted according to IP protocols provides an "end-to-end" solution, such that the encrypted data is transmitted in its encrypted format to the end device or client. By contrast, PID is a data link protocol only, and as such, any encrypted data which is transmitted must be decrypted and re-encrypted at each segment of the transmission path, such that the encrypted data cannot be transmitted directly to the end device or client in its encrypted format.

Currently, security for the transmission of content over packet-based networks is handled through one-to-one key exchange mechanisms, in which a central server sends a key individually to each end user computer. Clearly, sending such a key separately to each such computer is inefficient, as it requires extensive bandwidth. Furthermore, the management of such keys is also difficult, although a number of attempted solutions have been proposed.

For example, IPSEC (Internet security framework) was initially developed as a framework for unicast protocols, which was also intended for use for multicast transmission as an additional feature (but which was not specifically designed for multicast transmissions). However, some of the elements that can be useful in a unicast environment become problematic when extended to multicast situations. A case in point is key based security systems and their required infrastructure.

There are two main areas for classic key management in a multicast environment: initializing a multicast group with a common key and rekeying (or updating) the multicast group. For example, public key systems require a mechanism for obtaining the public keys necessary. A server and request model per session is notably insecure, e.g. imposter, man-in-the-middle, etc. If a client-server model is to be used, then third party authentication and certification is also necessary, for example according to the X.509 standard. This standard allows for certification hierarchy, and traversal of trusted paths; however, it is a slow and traffic heavy distribution method.

Cryptographic techniques have been proposed in order to increase the security of key distribution, by encrypting the keys before they are sent. Unfortunately, a basic problem with using cryptographic techniques for key distribution is that each user must be authenticated to receive a key.

In general, standard group key management schemes establish and manage a common key for all members of a group. These management schemes are used for encryption standards and group authentication. A particular problem in this area is related to key revocation methods, as these models tend to work with largely static key possession, since updating with the distribution methods available tends to be bandwidth expensive and time consuming. Examples of key management protocols are described with regard to United Kingdom Patent No. GB 2353682 and U.S. patent application Ser. No. 09/502,867, both of which are hereby incorporated by reference as if fully set forth herein.

One example of a significant Group Key Management proposal is the GKMP protocol, which uses symmetric keys for all members of the group. This mechanism features a dedicated Group Controller (GC) whose responsibility is managing the group keys. The GC generates group keys in a joint operation with a selected group member. It then communicates with each member separately, validating permissions and sending it a group key, which is encrypted using a shared key (between that member and the GC). This method has very obvious and severe scaling difficulties.

The Scalable Multicast Key Distribution protocol uses Core-Based Tree routing protocol and provides a secure join to a group tree in a scalable method. In such a tree, the routers know the identities of their tree neighbors, and starting from the core which serves as a GC (for generating group session keys and key distribution keys) and working outwards, each router is delegated the ability to authenticate joining members and provide them with the group key. This method is scalable, however it is tied to a specific routing protocol, and combines routing with security, such that each router must be fully trusted since it has the same keys as the GC.

In MKMP (Multicast Key Management Protocol), the initial Group Key Manager (GKM) delegates key distribution authority dynamically. The GKM generates a group key and then sends a multicast message soliciting members to whom it can delegate the distribution authority for the rest of the group members. A message containing keys and access lists is sent to and decrypted by those solicited members, who will then operate as GKMs in their own right. This method allows for a dynamic adaptable on-line group topology. Since MKMP uses a single key for the total group it avoids multiple (hop-by-hop) decryption/re-encryption of payload.

Lolus deals with scalability issues by using a "secure distribution tree", wherein the multicast group is divided into a hierarchical set of subgroups. There is a Group Security Controller (GSC) at the top level and Group Security Intermediaries (GSIs) for managing the subgroups. Each subgroup has its own sub-key, chosen by the GSI. The GSI knows the keys to the subgroup and the next higher group and translates messages between the levels. This models suffers from built in latency, during decryption and re-encryption and has difficulties dealing with untrusted GSIs.

In general, GKMP systems which rely on a single group controller still have difficulty scaling to large systems and are burdened by the 'single point of failure' attribute. Single point of failure in this instance also reflects in the security realm. Where, in some of the models above, more than one GC is used, the compromise of one such GC usually means a compromise of the other GCs as well. Furthermore, all of these protocols suffer from drawbacks in the area of compromise recovery and/or revocations of membership.

Various methods have been discussed in the literature in order to improve group key management systems, for example by using groups of members as controllers and cluster architectures. Hardjono, et al ("Secure IP Multicast: Problem areas, Framework, and Building Blocks", Internet Research Task Force, draft-irtf-smug-framework-01.txt September 2000; for other references, see the list at the end of this section) suggest a further extension of the Lolus tree distribution model, and other extensions/proposed solutions have also been suggested.

In 'Key management for Multicast: Issues and Architecture' (see full reference below), a hierarchical tree approach is proposed in order limit the number of transmissions (key exchanges) and storage (of keys) required. Although more efficient than other variations, the basic key distribution principles are still enforced and are still subject to the same arguments previously cited against standard key distribution models.

The above problems become even more complex with regard to key revocation. In order to prevent new group members from accessing older data or leaving members from accessing new data, a group controller has to change the multicast group key whenever membership in the group changes. Adding a new member either from a central GC or from one of the distributed models is fairly straight forward and efficient, i.e. using a one to one unicast model. However revoking membership rights in the standard group key protocols becomes very problematic, because the leaving member already has the group key.

The approach taken by many key management protocols (GKMPA, SMKD, MKMP) to remove members is to generate a new group key, and to send it independently to each of the remaining group members, usually using secret keys which are shared between each of the members and the GC. In this scenario, a new multicast group is created. But the scaling problems here are significant, as are the timing issues, i.e. how to make the new key available in time to access the new data, and how to manage cases where it does not. In particular, the group is not operational during the recovery process once the old key has been declared to be invalid, such that recovery/revocation processes are inefficient and may even prevent the legitimate members from receiving data and/or other services. Timing issues are less significant for the initial creation of the group, since members may be selected and may receive the key(s) well in advance of the actual operation of the group.

The alternatives discussed above where groups are divided into various sub-groups, be they trees, hierarchical trees, clusters, etc allow for better scaling by simply requiring changes within the affected subgroup. It does become more complex when one of the local controllers for a group becomes untrusted, since replacement keys must be handled within a complex structure, and between different levels of influence.

Various other mechanisms are defined in the literature to overcome these problems, including using sets and subsets of keys distributed amongst the group members, multiple keys distributed in such a fashion that each member cannot compute a new key value on its own, but rather requires active participation of the other members, etc. None of these mechanisms overcome the previously described problems which are inherent to such key distribution mechanisms.

REFERENCES

1. Vicki Johnson and Marjory Johnson—IP Multicast Initiative (IPMI) White Papers—Stardust.com Inc. www.ipmulticast.com
2. T. Hardjono, R. Canetti, M. Baugher, P. Dinsmore "Secure IP Multicast: Problem areas, Framework, and Building Blocks", Internet Research Task Force, draft-irtf-smug-framework-0.1.txt September 2000.
3. T. Hardjono, R. Cain, N. Doraswamy "a Framework for Group Key Management for Multicast Security", Internet Engineering Task Force, drafi-ietf-ipsec-gkmframework-03.txt August 2000.
4. D Wallner, E. Harder, R. Agee—Key Management for Multicast: Issues and Architectures, National Security Agency June 1999. Network Working Group—Request for Comments: 2627. Copyright The Internet Society 1999.
5. Harney, H., Muckenhirn, C. and T. Rivers, "Group Key Management Protocol (GKMP) Architecture", RFC 2094 September 1994.
6. Harney, H., Muckenhirn, C. and T. Rivers, "Group Key Management Protocol Specification", RFC 2093 September 1994.
7. H. Harney, A. Colegrove, E. Harder, U. Meth, R. Fleisher, "Group Secure Association Key Management Protocol", INTERNET-DRAFT, draft-harney-sparta-gsakmp-sec-02.txt, June 2000.
8. Ballardie, T. "Scalable Multicast Key Distribution", RFC 1949 May 1996.
9. R. Canetti, B. Pinkas "A Taxonomy of Multicast Security Issues" draft-irtf-smug-taxonomy-01.txt August 2000.
10. O. Rodeh, K. Birman, D. Dolev "Optimized Group Rekey for Group Communication systems", http://www.cs.huji.cs.huji.ac.il~orodeh/papers/opt/main.html.
11. Bellovin, S. M. "Problem Areas for the IP Security Protocols" Proceedings of the Sixth USENIX UNIX Security Symposium San Jose Calif., July 1996.
12. S. Frankel, S. Kelly, R. Glenn, "The AES Cipher Algorithm and Its Use With Ipsec" Ipsec Working Group, draft-ietf-ipsec-ciph-aes-cbc-01.txt November 2000.
13. S. Kent, R. Atkinson "IP Encapsulating Security Payload (ESP)", Network Working Group Request for Comments: 2406 November 1998.
14. S. Kent, R. Atkinson "Security Architecture for the Internet Protocol", Network Working Group Request for Comments: 2401 November 1998.
15. R. Canetti, et al "An Architecture for Secure Internet Multicast", draft-ietf-ipsec-sec-mcast-arch-00.txt. No date given.
16. Rogaway, P. "Problems with Proposed IP Cryptography", Comments draft-rogaway-ipsec-comments-00.txt, Apr. 3, 1995.
17. Mittra, S. "Lolus: A Framework for Scalable Secure Multicasting" Proceedings of the ACM SIGCOMM 1997.
18. Ming, D. "Techniques for multicast key update" Email message received on Smug Mail List, Mar. 31, 2000.
19. U.S. Pat. No. 5,282,249: System for controlling access to broadcast transmissions, M. Cohen, J. Hashkes, Jan. 25, 1994.
20. U.S. Pat. No. 5,420,866: Methods for providing conditional access information to decoders in a packet-based multiplexed communications system, A. J. Wasilewski, Scientific_Atlanta, Inc, May 30, 1995.
21. U.S. Pat. No. 5,481,609: System for controlling access to broadcast transmissions, M. Cohen, J. Hashkes, News Data Security Products Ltd. Jan. 2, 1996.
22. U.S. Pat. No. 6,049,878: Efficient, secure multicasting with global knowledge, G. Caronni, M. Waldvogal, Sun Microsystems Apr. 11, 2000.
22. U.S. Pat. No. 6,195,751: Efficient, secure multicasting with minimal knowledge, G. Caronni, M. Waldvogal, Sun Microsystems Feb. 27, 2001.
23. U.S. Pat. No. 6,108,706: Transmission announcement system and method for announcing upcoming data transmissions over a broadcast network, K. J. Birdwell, et al, Microsoft Corporation, Aug. 22, 2000.
24. U.S. Pat. No. 6,002,768: Distributed registration and key distribution system and method, A. Albanese, R. Oppliger, International Computer Science Institute, Berkeley, Calif., Dec. 14, 1999.
25. U.S. Pat. No. 5,784,463: Token distribution, registration, and dynamic configuration of user entitlement for an application level security system and methods, J. F. Chen, J Wang, V-ONE Corporation. Jul. 21, 1998.
26. U.S. Pat. No. 6,061,791: Initial secret key establishment including facilities for verification of identity, T. Moreau, Connotech Ecperts-Conseils Inc. May 9, 2000.
27. U.S. Pat. No. 4,868,866: Broadcast data distribution system, B. L. Williams Jr., McGraw-Hill, Sep. 19, 1989.
28. U.S. Pat. No. 5,761,306: Key replacement in a public key cryptosystem, T. Lewis, Visa International Service Association, Jun. 2, 1998.
29. U.S. Pat. No. 5,748,736: System and method for secure group communications via multicast or broadcast, S. Mittra, May 5, 1998.
30. U.S. Pat. No. 6,026,167. Method and apparatus for sending secure datagram multicasts, A. Aziz, Sun Microsystems Inc. Feb. 15, 2000.
31. U.S. Pat. No. 5,029,208: Cipher-key distribution system, K. Tanaka, NEC Corporation, Jul. 2, 1991.
32. U.S. Pat. No. 5,778,187: Multicasting method and apparatus, A. Monteiro, J. F. Butterworth, Netcast Communications Corp, Jul. 7, 1998.
33. A. Kleinmann, "Scenarios and Requirements for Business-Oriented Multicast Security", Secure Multicast Research Group, Meetings, Dec. 7, 1998.

The disclosures of all references mentioned above and throughout the present specification are hereby incorporated herein by reference.

SUMMARY OF THE INVENTION

None of the disclosed background art solutions provides a security system for the delivery of targeted digital media content through a packet-based network such as the Internet. Furthermore, none of the references teaches or discloses a mechanism for providing such a security system without requiring one-to-one key exchange, while still enabling selection of specific digital media content by particular end users. In addition, none of the references teaches or suggests a mechanism for broadcasting digital media content in a secure manner to a general group of end users, while still maintaining the desired degree of specificity in terms of those end users who actually use or access the digital media content. Also, none of the references teaches or suggests a mechanism for broadcasting and/or multicasting which is itself both efficient and secure, such that the security mechanisms do not detract from the performance of the actual delivery mechanism.

Therefore, there is an unmet need for, and it would be highly useful to have, a system and a method for secure digital content delivery, which enables digital media content to be delivered through a packet-based network such as the Internet, without requiring any inherent security in the provisions of the network itself, and without requiring one-to-one key exchange.

The present invention, in preferred embodiments thereof, fulfills these needs by providing a system and a method for secure distribution of digital media content through a broadcast network, which may be a packet-based network such as the Internet and/or any type of IP network (even for those IP networks which are not packet-based networks). However, for the purposes of discussion only, the following description centers around packet-based networks, and more specifically IP networks which are packet-based networks, such as the Internet for example. In addition, the present invention is particularly concerned with broadcast and/or multicast transmissions through such networks.

The security of the present invention does not require one-to-one key exchange, but rather enables keys, and/or information required in order to build the key, to be broadcast through the network. The digital media content is then also preferably broadcast, but cannot be accessed without the proper key. However, preferably only authorized end-user devices are able to access the digital media content, by receiving and/or being able to access the proper key. Thus, the present invention is useful for other types of networks in which digital media content is more easily broadcast rather than unicast, in addition to packet-based networks.

The present invention, in preferred embodiments thereof, supports the distribution of content to end user devices from one or more central distribution points, as in client-server models and variations thereof, and/or peer-to-peer distribution, for example between end user devices. In addition, the present invention, in preferred embodiments thereof, also supports distribution models within either of these mechanisms for unitary distribution, to a specified end user device, or broadcast/multicast distribution, to a plurality of end user devices. In any case, in order for the distributed content to be operative, for example to be "played back" or otherwise displayed, the recipient end user device is optionally and more preferably in communication with a broadcaster at least once before such a display is permitted. The broadcaster then enables the recipient end user device to play back or otherwise display the received content, for example by sending a code to the recipient end user device. Optionally, the broadcaster may require payment to be received before enabling the content for the recipient end user device. Thus, the present invention supports flexible distribution of content according to a number of different distribution models, while still preventing unauthorized play back or other display.

According to preferred embodiments of the present invention, there is provided a combination of secure hardware and software to prevent and/or at least retard unauthorized access or "hacking". In order for access to the distributed content to be controlled, the content itself must be protected, for example by encryption or scrambling. Hereinafter, the term "scrambling" is considered to encompass both encryption, which involves the mathematically determined alteration of content or even only a part thereof to a form which cannot be read without the proper key, and a simpler form of scrambling, which involves the rearrangement of portions of the content, such that the content is only readable when properly rearranged. Indeed, even the simpler forms of scrambling can be effectively performed by altering, or otherwise rendering inaccessible, a small percentage of the overall content, after which the entire unit of content can no longer be displayed. By protecting the content itself, the present invention enables the content to be completely portable, and to be distributed freely, while still ensuring that control of access to the content is maintained by a central authority as required.

The preferred combination of hardware and software components enables the present invention to most effectively protect access to the content, while still enabling the user to easily and transparently play back, or otherwise display, the content. More preferably, the end user device which is used for the present invention includes a security module, for unscrambling the digitally scrambled content according to a received code. The security module optionally and more preferably features a renewable security submodule, such as a smart card with a smart card reader for example, although of course any suitable combination of software and/or hardware may optionally be used. The security module receives the necessary code from the broadcaster, and is then able to unscramble the received content for play back or other display. Most preferably, the operation of the security module is transparent or substantially transparent to the end user.

According to the present invention, there is provided a method for creating a secure transmission mechanism for a plurality of end user devices in a packet-based network, comprising: providing a plurality of packets; securing the plurality of packets according to security information to form secured packets; transmitting the security information to more than one end user device simultaneously through the packet-based network; and multi-casting the secured packets to the plurality of end user devices.

According to another embodiment of the present invention, there is provided a method for producing a conditional access (CA) system for use in a packet-switched environment (packet CA system) from a CA system for use in a broadcast environment (broadcast CA system), the method comprising: providing a broadcast CA system comprising at least one CA security characteristic; providing a packet-switched data transmission system including a security subsystem having a plurality of packet-switched security characteristics; and creating a mapping from the at least one CA security element to at least one of the plurality of packet-switched security elements, thereby producing a packet CA system.

According to yet another embodiment of the present invention, there is provided a packet-switched conditional access (CA) system for use with an end-user playback device, the CA system comprising: a protected data receiver for receiving protected data protected with at least one key; an ECM packet receiver for receiving at least one ECM packet from a packet-switching network; and an ECM-based key generator for generating the at least one key from the at least one ECM packet.

According to still another embodiment of the present invention, there is provided a method for providing an entitlement control message (ECM) based conditional access (CA) system based on a packet-switching network comprising: receiving a plurality of ECMs via the packet-switching network; storing the plurality of received ECMs; and choosing, from among the plurality of stored ECMs, an ECM for providing access to CA-protected data.

According to yet another embodiment of the present invention, there is provided a method for creating a secure transmission mechanism for a plurality of end user devices in a packet-based network, comprising: encrypting a plurality of packets with a key to form encrypted packets, the key having associated key information for determining the key; multi-casting the associated key information to the plurality of end user devices through the packet-based network, thereby obviating the need to send the associated key information to each end user device individually; and multi-casting the encrypted packets to the plurality of end user devices to form the secure transmission mechanism.

According to still another embodiment of the present invention, there is provided a method for creating a secure transmission mechanism for a plurality of end user devices in a packet-based network, comprising: multi-casting a plurality of secured packets and security information to the plurality of end user devices, thereby obviating the need for a one-to-one transmission of the security information to each end user device individually and thereby forming the secure transmission mechanism.

Hereinafter, the terms "file", "portion", "item" or "stream", with regard to digital content, are used interchangeably and refer to any unit of data for such digital content, whether as a functional unit such as a packet for example, or as a conceptual unit such as a television program for example. "Streamed" or "streaming" data may also be considered as being formed from any type of unit of data.

Hereinafter, the term "display" refers to any type of playback or playing out of media content data for a user, or otherwise rendering such data sensible to one or more human senses, including, but not limited to, the audible production of audio data and the visible production of video data, and combinations thereof.

Hereinafter, the term "network" refers to a connection between any two or more computational or other electronic devices which permits the transmission of data.

Hereinafter, the term "computational device" includes any type of digital instrument which is capable of operating a software program.

For the present invention, a software application could be written in substantially any suitable programming language, which could easily be selected by one of ordinary skill in the art. The programming language chosen should be compatible with the computational device according to which the software application is executed. Examples of suitable programming languages include, but are not limited to, C, C++, Java and Assembly.

In addition, the present invention could be implemented as software, firmware or hardware, or as a combination thereof. For any of these implementations, the functional steps performed by the method could be described as a plurality of instructions performed by a data processor.

Hereinafter, "Applied Cryptography" by Bruce Schneier, John Wiley 2nd ed. 1996, is incorporated by reference as if fully set forth herein, for the teachings regarding cryptography and techniques for implementation thereof.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
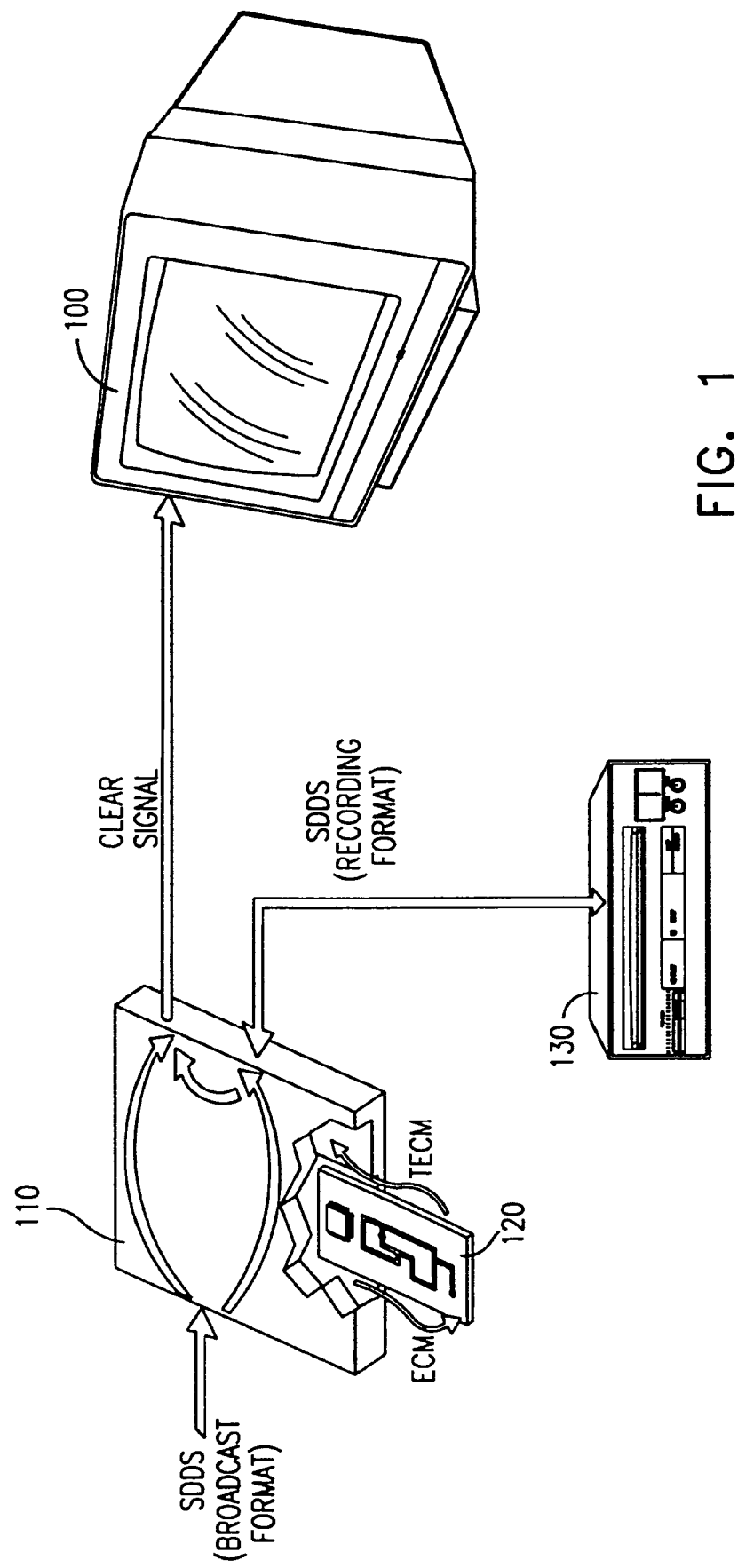
FIG. 1 is a schematic block diagram of a background art system.
Figure 2:
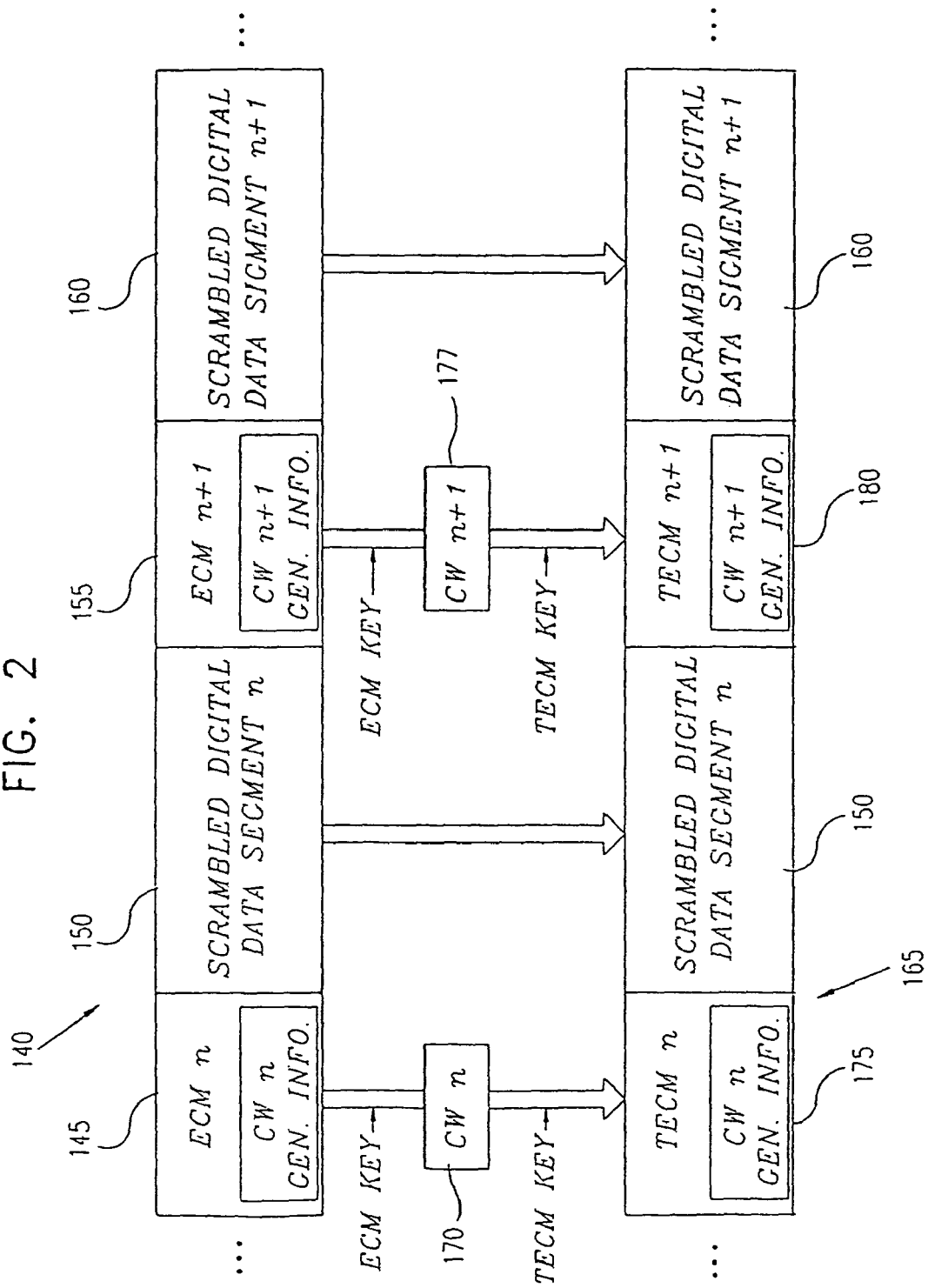
FIG. 2 shows a flow diagram illustrating the production of the digitally scrambled digital content according to the background art.

The present invention features a system and a method for secure distribution of digital media content through a packet-based network such as the Internet, or another type of IP network, through multicasting and/or broadcasting of data. The security of the present invention does not require one-to-one key exchange, but rather enables keys, and/or information required in order to build the key, to be broadcast through the packet-based network. The digital media content is then also preferably broadcast, but cannot be accessed without the proper key. However, preferably only authorized end-user devices are able to access the digital media content, by receiving and/or being able to access the proper key. Thus, the present invention is useful for other types of networks in which digital media content is more easily broadcast rather than unicast, in addition to packet-based networks and/or various types of IP networks.

The present invention supports the distribution of content to end user devices from one or more central distribution points, as in client-server models and variations thereof, and/or peer-to-peer distribution, for example between end user devices. In addition, the present invention also supports distribution models within either of these mechanisms for unitary distribution, to a specified end user device, or broadcast/multicast distribution, to a plurality of end user devices. However, for the purposes of the present invention, distribution by broadcast and/or multicast is considered to be particularly preferred. In any case, in order for the distributed content to be operative, for example to be "played back" or otherwise displayed, the recipient end user device must have been in communication with a broadcaster at least once before such a display is permitted. The broadcaster then enables the recipient end user device to play back or otherwise display the received content, for example by sending a code to the recipient end user device. Optionally, the broadcaster may require payment to be received before enabling the content for the recipient end user device. Thus, the present invention supports flexible distribution of content according to a number of different distribution models, while still preventing unauthorized play back or other display.

According to a preferred embodiment of the present invention, the digital media content is securely transmitted through an IP network as the packet-based network (although non-packet based IP networks and/or non-IP but packet-based networks are also optionally implemented with the present invention). Optionally, the IP network is the Internet. However, transmission of such digital media content may be different than transmission of other types of data through a network such as the Internet. For example, a typical Internet-based content provider does not have a continuous or at least continuing relationship with the end user, but instead may only supply such content on a "one-off" or one-time basis.

By contrast, a broadcaster of digital media content through an IP network may optionally wish to require a subscription or repeated payments for repeated accesses to the digital media content, although alternatively, the security information may optionally be "hard-wired" into the end user receiving device. Also, payment is more likely to be regular and repeated, rather than a single individual payment. Therefore, broadcasters of content through an IP network need be able to handle many end users in a secure, scalable manner. As previously described, one-to-one key exchanges are clearly not a reasonable, efficient, scalable mechanism for such security.

The environment of IP networks such as the Internet is also based upon a particular group of standards, which define the protocols for communication through such a network, and which are different from the communication protocols and standards for transmission through a dedicated cable network, for example. These protocols must be used for communication through the network. Thus, the present invention is preferably constructed with agreed standards and protocols, of which an example is given below for an IP network, it being understood that the present invention is operative with substantially any type of packet-based network.

Security for IP networks is currently based upon the IPSEC (Internet security framework) for creating the related set of standards, which are intended to provide a security protocol in the network layer as part of the network structure. The IPSEC standards assume but do not require that security is based upon key exchange protocols. These standards do not consider multicast scalability issues, particularly with regard to key exchange and management issues for large numbers of simultaneous users. However, the present invention is preferably compatible with the IPSEC standards, while differing in the actual application of the security protocol itself, for example by associating the media content stream with the matching ECMs (entitlement control messages) according to the IPSEC announcement protocol. More preferably, at least certain IPSEC mechanisms are used for coordinating the delivery of security information such as ECMs to the end user devices, in order to ensure compatibility between the system of the present invention and other systems.

According to preferred embodiments of the present invention, there is provided a combination of secure hardware and software to prevent and/or at least retard unauthorized access or "hacking". In order for access to the distributed content to be controlled, the content itself must be protected, for example by encryption or scrambling. Hereinafter, the term "scrambling" is considered to encompass both encryption, which involves the mathematically determined alteration of content or even only a part thereof to a form which cannot be read without the proper key, and a simpler form of scrambling, which involves the rearrangement of portions of the content, such that the content is only readable when properly rearranged. Indeed, even the simpler forms of scrambling can be effectively performed by altering, or otherwise rendering inaccessible, a small percentage of the overall content, after which the entire unit of content can no longer be displayed. By protecting the content itself, the present invention enables the content to be completely portable, and to be distributed freely, while still ensuring that control of access to the content is maintained by a central authority.

The preferred combination of hardware and software components enables the present invention to most effectively protect access to the content, while still enabling the user to easily and transparently play back, or otherwise display, the content. More preferably, the end user device which is used for the present invention includes a security module, for unscrambling the digitally scrambled content according to a received code. The security module optionally and more preferably features a renewable security submodule, such as a smart card and smart card reader for example, although any combination of hardware and/or software may optionally be used. The security module receives the necessary code from the broadcaster, and is then able to unscramble the received content for play back or other display. Most preferably, the operation of the security module is transparent or substantially transparent to the end user.

The principles and operation of the present invention may be better understood with reference to the drawings and the accompanying description.

Figure 3:
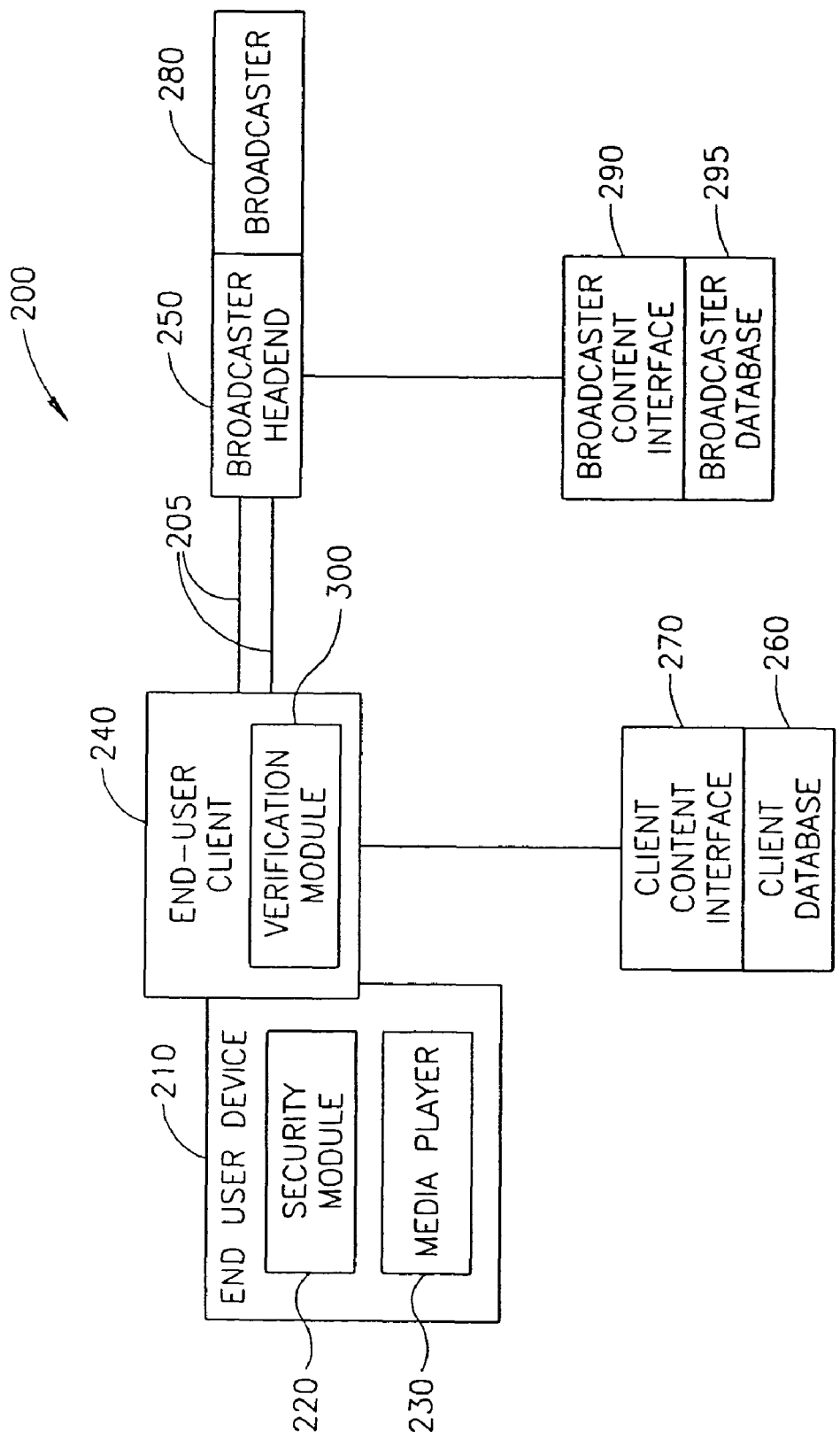
FIG. 3 is a schematic block diagram of a system according to the present invention for secure delivery of digital content through a packet-based network.

Referring, now to the drawings, FIG. 3 is a schematic block diagram of an illustrative system according to the present invention for secure delivery of digital media content through a packet-based network as an exemplary but preferred implementation of the present invention, as previously described.

As shown, a system 200 features an end user device 210 with an associated security module 220. Security module 220 optionally and preferably comprises a smart card, such that end user device 210 (or security module 220) would also feature a smart card reader, although of course other implementations are possible. For example, security module 220 could optionally be implemented as software alone, or as a combination of hardware and software. For the purposes of description below only and without any intention of being limiting in any way, security module 220 is assumed to include a smart card reader and smart card.

End user device 210 also features a media player 230 for playing back or otherwise displaying at least one type of media content, such as audio content for example. End user device 210 operates an end-user client 240, which acts as the interface between end user device 210 and a broadcaster headend 250. End user device 210 and broadcaster headend 250 communicate through at least one channel 205. Two such channels 205 are shown, although optionally system 200 could feature more channels 205, or alternatively could feature only one channel 205. At least one channel 205 is preferably a network, which could be substantially any type of suitable network, including but not limited to, the Internet, a cable network or a satellite distribution mechanism. Optionally but more preferably, as described in greater detail below, such a channel 205 is an IP network, such that communication between end user device 210 and broadcaster headend 250 is in the form of an IP session. However, the term "channel" itself may refer to any type of mechanism for data transmission, regardless of the type of data and/or the transmission medium.

Broadcaster headend 250 in turn communicates with broadcaster 280 in order to provide at least the security information to end user device 210 through end-user client 240.

More preferably, only security features are provided to end user device 210 through end-user client 240, and the actual content is transmitted separately. Optionally and more preferably, the actual media content is transmitted from a broadcaster content interface 290 to a client content interface 270, through a same or different channel 205 as the associated security information, such that the security information is not necessarily transmitted with the secured content. Client content interface 270 then passes the media content to media player 230, after such media content has been accessed with the necessary security information. Optionally and most preferably, each of client content interface 270 and broadcaster content interface 290 has access to a particular database for storing the security information, shown in FIG. 3 as a client database 260 and a broadcaster database 295 respectively. Each of client database 260 and broadcaster database 295 is preferably secured with some type of security mechanism.

The security features for the content are preferably provided by encrypting the content, such that access to the media content is only possible for authorized users, although optionally contact with broadcaster 280 and/or broadcaster headend 250 is not required. However, rather than using one-to-one key exchange, which would be very inefficient as it would require specific transmission of the key to each end user device 210, preferably access information is broadcast or multicast to a plurality of end user devices 210. This information could be sent in the form of a particular message through channel 205, in which case the information would be a permission message. The presence or absence of information which is locally accessible by each end user device 210 then determines whether the broadcast or multicast access information is actually usable by a particular end user device 210, more preferably in order to create a key which is then used to access the media content by security module 220. Optionally, if a plurality of different broadcasters 280 are present, separate storage space for credit information and/or other broadcast information is preferably provided on said security module 220 for each broadcaster 280.

According to a particularly preferred embodiment of the present invention, the access information is preferably distributed through an ECM (control message), which more preferably enables end user device 210 to create the correct key and as such may be considered to be an example of a permission message. For example, the ECM could comprise a seed which is input into a function performed by security module 220, the result of which is the key required to access the media content, by decrypting the media content or otherwise rendering the media content into a displayable format.

Optionally, the ECM is broadcast to all end user devices 210, but the particular end user device 210 is more preferably only able to generate the key if this end user device 210 also receives an EMM, or entitlement message, from broadcaster headend 250. The EMM is optionally and more preferably used for periodic renewal of security module 220, such that without periodic receipt of such an EMM, security module 220 eventually is no longer able to access the media content, since security module 220 is no longer able to use the ECM information to generate the key for decrypting or otherwise accessing the media content. More preferably, each EMM contains one or more content service identifiers, which may be an alphanumeric string for example. Although the term "service identifier" is used herein, it should be noted that in face such identifiers may optionally refer to any type of authorization, and not only authorizations for services. At least one such identifier is also present in the ECM, such that security module 220 is more preferably only able to access those ECMs for which a matching service identifier has been delivered in a EMM. It should be noted that there is not necessarily a one-to-one relationship between each EMM and/or each service identifier and each ECM, since service identifiers may optionally be used for granting permission to access more than one ECM, and since each ECM may optionally contain more than one such service identifier. Most preferably, each service identifier expires after the multi-cast session has finished, in order to prevent security module 220 from being able to grant access to "old" previously transmitted data, although optionally the service identifier could then be renewed and used again for a different such session.

According to an optional but preferred embodiment of the present invention, for "pay per view", an EMM is not necessarily required, although it may optionally be required in order to set those conditions under which the purchase may be made, such as possession of a particular number of credits by security module 220 for example. Instead, security module 220 would preferably receive a ECM which allows a "free preview", and/or which contains the necessary information for purchasing the content. Such an ECM could optionally and more preferably be labeled with a "general" or generic service identifier, such that the ECM would be accepted by any security module 220 and/or by security modules 220 of a particular type of end user device 210. The user could then more preferably instruct end user device 210 to purchase the content, for example through security module 220. Optionally and most preferably, credits or other units of exchange for content are kept on security module 220, particularly if security module 220 is implemented with a smart card, in order for the account of the end user to be immediately or later debited for the purchased content. Also optionally, an EMM could be used to deliver credits, tokens or the like, to enable end user device 210 to be used to purchase the "pay per view" content.

According to the optional but preferred embodiment of the present invention, the content of the EMM is stored securely in the smart card or other secure portion of security module 220. Thus, the key, or information required to generate the key, may optionally be broadcast, while the ability to use such a key is preferably still controlled by broadcaster 280, through the distribution of some type of permission message for example.

The EMM itself could also optionally be sent to a plurality of different end user devices 210 at one time, as a broadcast or multicast, such that a group of end user devices 210 would receive the information at once. For example, a particular EMM could be designated for one group of end user devices 210, according to a particular subscription plan or other type of payment structure, and/or according to the network address of the members of the group of end user devices 210. Alternatively or additionally, a particular ECM may preferably be blocked for a particular group of end user devices 210 for a "blackout". Such a blackout may optionally be implemented for such a group according to geographical location, for example in order to obey laws in a particular country, and/or according to characteristics of individual end users within the group, for example according to subscription and/or parental rating information. Preferably, the blackout is determined through a blackout identifier which is contained in the ECM, for identifying an end user device blocked from accessing the content of a particular ECM, such that access may also include the ability to use a control word and/or information for generating such a control word which is provided through the ECM.

Other types of differential access may also optionally be implemented within the present invention such that differential access is preferably defined for different levels of users. For example, such differential access can optionally be determined within the ECM based on service identifiers, where multiple service identifiers apply to one transmission and are contained in a single ECM, such that a blackout would preferably be applied to the services which are not allowed.

For a packet-based network, and particularly for an IP network such as the Internet, the EMM and ECM information is preferably sent through channel 205 according to a particular packet format. End-user client 240 would receive a packet for ECM information which would optionally and preferably contain a header for specifying those service identifiers to which the packet information would apply, thereby also specifying which security modules 220 are able to access the ECM information, since preferably only those security modules 220 with the corresponding service identifier would be permitted to access the ECM information. Security module 220 would then compare the specified service identifier(s) to the service identifier information stored by security module 220, and/or within an associated component, such as a smart card for example. If the packet is relevant to such a stored service identifier, then security module 220 would read the ECM information contained within the packet, in order to be able to access particular media content. Such a mechanism would enable ECM information to be generally transmitted to a plurality of end user devices 210, but only to be used by those end user devices 210 for which it is relevant.

More preferably, broadcaster 280 controls the connection between each ECM and the media content to which the ECM provides access. If the use of EMM information/service identifiers is implemented as preferred, broadcaster 280 also preferably controls the connection between each service identifier and the ECM information to which the service identifier grants access. Such control enables broadcaster 280 to determine which end user device 210 receives access to which media content, for example according to payment by the end user, subscription basis and/or other factors, without requiring broadcaster 280 to specifically transmit a key to each end user device 210 on a one-to-one basis. Furthermore, since most preferably both ECM information and service identifiers are renewed periodically, and indeed most preferably must be renewed periodically, the ability to broadcast or multicast ECM information and/or service identifiers to end user devices 210 is even more important, since otherwise significant amount of bandwidth for channel 205 and computational resources would need to be devoted simply to renewing the access information.

Optionally, broadcaster headend 250 repeatedly transmits the ECM while the media content is being received and displayed by end user device 210, in order to require security module 220 to repeatedly derive the key for decrypting or otherwise accessing the media content. This requirement provides additional security, such that if the key or other security information is somehow obtained by an unauthorized user, changing the security information would prevent the unauthorized user from accessing all of the media content. Additionally or alternatively, repeatedly transmitting the ECM has the advantage of enabling an authorized security module 220 to rapidly access the multi-cast content, even if access is initiated in the middle of a multi-cast session. Each period for which the security information is transmitted and/or valid may be termed a "key period", optionally for validating the ECM. The length of the key period may optionally be determined according to a length of time, for example, and/or could be determined by the duration of a particular multi-cast session. Other optional but preferred features of the key period include, but are not limited to, transmitting the security information, such as the ECM, in advance of the media content; short duration for the key period itself and/or rapid key change (on the order of seconds between changes); and buffering previously received ECM information and/or previously derived keys, if such information is not changed but only renewed. Both optional features prevent access to the media content from being disrupted because the transmission of the ECM is delayed, which is particularly important for IP networks and other types of networks for which transmission of the packet is not guaranteed. A corresponding preferred feature of EMMs is an authorization period, such that EMMs are preferably only valid for the authorization period, after which a new EMM must be received. Thus, the security information is still renewed, while also supporting access of authorized end users to the media content, even in a non-reliable network environment such as the Internet.

According to a preferred embodiment of the present invention, end user device 210 operates a verification module 300 for verifying both the received security information from broadcaster headend 250 and the authenticity of the information contained within security module 220.

Verification module 300 preferably filters all communication external to end user device 210, whether from broadcaster headend 250 or from another communication source, in order to determine whether such communication should be passed to security module 220. For example, verification module 300 could optionally have access to identifiers for identifying particular information which is contained in EMMs, in order to determine whether security module 220 has access to such EMMs. Such identifiers may optionally include, but are not limited to, identifiers for determining access according to at least one characteristic selected from the group consisting of a characteristic of end user device 210 and a characteristic of information stored on end user device 210.

Verification module 300 would then optionally be able to determine whether a received packet is relevant to that security module 220, according to the EMM information as previously described. Furthermore, verification module 300 could also optionally and preferably have access to the service identifiers which are stored in security module 220, in order to determine whether a particular ECM should be passed to security module 220 for further processing. In addition, more preferably verification module 300 also determines the authenticity of EMMs and/or ECMs, for example by determining whether such messages are digitally signed for verification.

According to other optional but preferred embodiments of the present invention, particularly in implementations containing a plurality of broadcaster headends 250, broadcaster headends 250 are distinguished with different levels of authorization and/or abilities. For example, some broadcaster headends 250 may only be allowed to transmit content based upon the type of service identifier.

In order to ensure compatibility between system 200 and other mechanisms for IP network security, preferably system 200 is in compliance with the IPSEC (Internet security framework) framework for determining standards, even if the features provided in these standards are not always completely used. As previously described, security for IP networks is currently based upon the IPSEC set of standards, which are intended to provide a security protocol in the network layer as part of the network structure. Optionally and more preferably, one of the announcement protocols of the IPSEC standards is used in order to associate encrypted or otherwise protected media content with the security information which is required for access, such as the particular ECM or ECMs for example. For any type of announcement protocol which is used, optionally and more preferably, the packets associated with such a protocol are encrypted, most preferably with a key which is not session-based but which is available and accessible over a longer duration (for example, during a particular subscription period). One non-limiting example of a standard for providing such encryption is the SAP (session announcement protocol) protocol of IETF. Alternatively, the announcements may also be delivered as plaintext, without encryption. However, for certain types of announcements, access to the information would preferably and preferably be restricted, for example only to those end user devices and/or security modules associated with a subscription. Alternatively or additionally, certain announcements could optionally and preferably be more freely available, for example in order to deliver general information such as a "free preview mode" for previewing content which could then optionally be purchased, which would optionally and more preferably be available to any end user device having an associated smart card (or other general characteristic).

One non-limiting example of a suitable IPSEC announcement protocol is the SDP (session description protocol), as described in RFC 2327, which is hereby incorporated by reference as if fully set forth herein. Of course, other types of announcement protocols could also optionally be used, such as CDF (Channel Definition Format) and new XML-based proposals for example. The protocol is intended to be able to describe multimedia sessions, in which a "session" is a set of multimedia sending and receiving devices, and the streams of multimedia data which flow from sending devices to receiving devices. The description of such sessions is intended to permit those participants in the session to receive information about initiating participation, and also about the session itself. With regard to the present invention, SDP is optionally and preferably used for conveying information about the protected media content which is transmitted from broadcaster headend 250 to end user device 210, and to coordinate between each ECM and the associated protected media content.

SDP is a text-based protocol, formatted by lines, in which each line has the format type <value>. This information would be contained within a packet as the payload for that packet. The information contained in the <type> field is exactly one character and is case-significant. The information contained in <value> is a structured text string. The protocol permits proprietary extensions to the list of various types which are permitted, by using the type a for attribute. Values of type a can optionally be used for the entire session, but alternatively may only be used for particular components within the session.

SDP is stated to be usable for transmitting encryption keys for one-to-one key exchange mechanisms. However, the background art does not teach or suggest the use of SDP for transmitting security information through the use of the a or attribute parameter. The present invention uses the attribute parameter for associating an ECM with the relevant session and/or a portion of the session, by transmitting the ECM as the value for the attribute. In addition, the attribute parameter could also optionally be used in order to limit access to different portions of any given service, for example based upon payment schemes or authority levels. For example, the line containing the ECM information could optionally have the format a=ecm:<CASID><IP address <UDP port#> in which "CASID" is an optional parameter for identifying the vendor of the particular system.

Another IPSEC standard which is optionally and preferably used for the present invention is the ESP (IP encapsulating security payload) protocol, as described in RFC 2406, which is hereby incorporated by reference as if fully set forth herein. The ESP format is optionally and preferably used in order to encapsulate encrypted content and to synchronize content packets with ECM information. ESP provides a header, containing information about security services, which is intended to be inserted after the IP header and before the upper layer protocol header for IP packets being transmitted in the transport mode. According to the standard, ESP is used to provide confidentiality, data origin authentication, connectionless integrity and limited traffic flow confidentiality.

The first value in the ESP header is the 32-bit security parameters index (SPI), which is stated in the standard to be used for uniquely identifying the Security Association for the packet, in combination with the destination IP address and the security protocol. The present invention uses the SPI value in order to associate a packet containing encrypted media content with the ECM that is required to generate the key which encrypted that media content. More preferably, client database 260 contains a table for determining this association, such that the SPI is at least part of a set of information for identifying the correct ECM for the media content, and hence the correct key which is to be used for decrypting the encrypted media content. Optionally, this set of information also includes the destination IP address, the protocol being used (such as ESP for example) and the port to which the media content is sent. The port information is preferred when the security information, such as the ECM, is sent to a particular port of end user device 210, for example when multiple vendors may supply end user device 210. However, only the SPI is preferably used in order to be able to announce to security module 220 that the ECM or other security information has been changed when the key period changes. Therefore, a range of SPI values is preferably provided, such that each of change of SPI value indicates a change to the required ECM, and hence to the key which must be generated in order to be able to decrypt the media content.

The background art does not teach or suggest the use of SPI values for indicating the initiation of a new key period, and hence the change of ECM information which is required. However, this implementation is particularly useful since it enables security module 220 to receive a plurality of different ECMs in advance of their actual use, without compromising the ability of broadcaster headend 250 to still control access by end user device 210. Without the SPI value itself, more preferably end user device 210 is not able to determine the correct ECM to be used to generate the key, since as previously described, the SPI is at least a part of the set of information which is required for determining the correct ECM to be used for decrypting or otherwise accessing the media content. Furthermore, the advantage of the SPI over background art methods for synchronization, such as using a binary (odd/even) value for synchronizing between the ECM and the media content, is that the SPI can optionally have a large range of values. In a non-reliable/potentially latent environment such as the Internet, which does not guarantee delivery of packets and which may as a result have a large latency period for such delivery, the large range of values effectively removes the dependence of each packet from the previous packet, so that receiving packets out of transmission order and/or even failing to receive a packet would not disrupt the security scheme.

Figure 4:
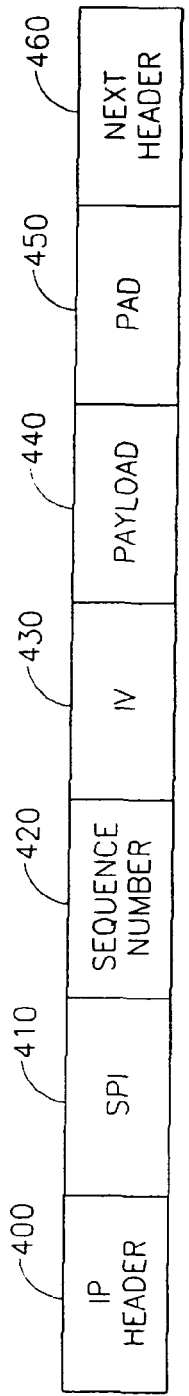
FIG. 4 shows an exemplary format of an encrypted media content packet according to the present invention.

According to an exemplary but preferred implementation of the present invention, the format of each encrypted media content packet is preferably as shown in FIG. 4. As shown, an IP header 400 for the packet is followed by the SPI value 410, as determined by the ESP standard as previously described. Next, a 32-bit sequence number 420 is included, also as determined by the ESP standard. Sequence number 420 starts at the value "1" and is monotonically increased for each packet until the maximum value ($2^{32}-1$) is reached, at which point the associated SPI value 410 is no longer valid and the next SPI value from the range of permitted values must be used. In fact, the maximum value may not be reached, since sequence number 420 is preferably reset for each key period when both the security information for the key and SPI 410 change.

The next value in the encrypted packet is optionally and more preferably an initialization vector (IV) 430, which may be required for operating certain types of encryption methods such as RC4, for example in order to improve the strength of the encryption by increasing the randomness thereof, as is known in the art. The format and length of IV 430 depend upon the particular encryption method.

The packet next features the encrypted media content itself, which is shown as a payload 440 for the packet. Payload 440 may also optionally include such information as the transport layer (UDP or TCP) header. After payload 440, the packet preferably features a PAD length 450 of one byte, which is always equal to zero. The packet then optionally and preferably features a next header 460, the value of which preferably depends upon the type of data which is included after the ESP header, in order to indicate whether the packet is being transmitted in transport mode or tunnel mode.

Figure 5:
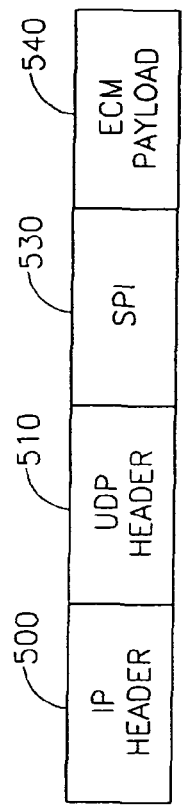
FIG. 5 shows an exemplary format for ECM packets according to the present invention.

FIG. 5 shows an exemplary format for ECM packets, which are preferably encapsulated as regular clear UDP packets. As shown, the ECM packet features an IP header 500, followed by a UDP header 510. After UDP header 510, a UDP payload 520 more preferably has two components: an SPI 530 for indicating the correct associated SPI value for the ECM information, and an ECM information payload 540, which contains the actual ECM information. However, substantially any other suitable format of packet could be used for transmitting the ECM information, as long as the ECM information is somehow associated with the correct SPI, so that end user device 210 is able to determine which ECM should be used with received encrypted media content.

Preferably, verification module 300 is able to filter ECM packets in order to determine which such packets are relevant to security module 220 (both not shown; see FIG. 3). Such filtration is optionally and more preferably performed by comparing previously distributed information from the announcement message about the association between the content and the combination of the IP multicast, UDP port and SPI values from the ECM packet, which are most preferably provided in the header. Most preferably, the IP address of the ECM packet is announced with the announcement message, as previously described, such that security module 220 may effectively "filter" the ECM packets by only listening to those IP address(es) for ECM packets for which security module 220 has an authorization, for example from the relevant EMM. Thus, only relevant ECM packets are preferably passed to security module 220.

Figure 6:
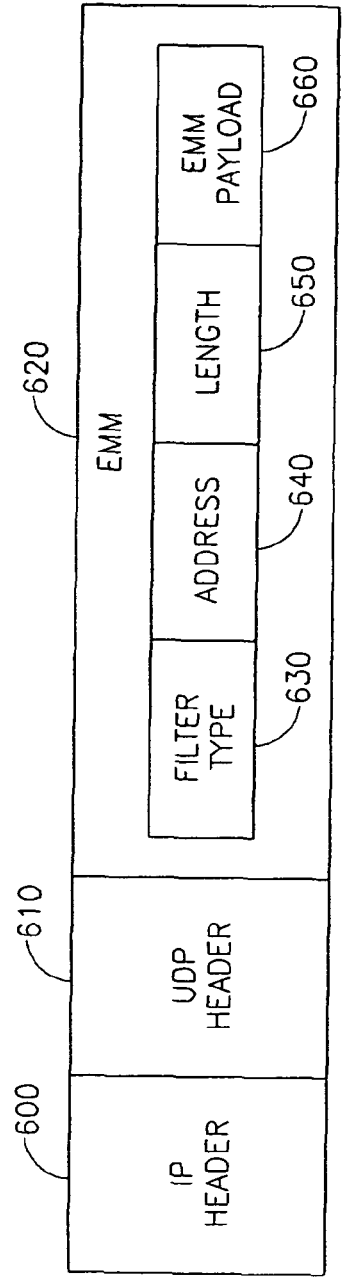
FIG. 6 shows an exemplary EMM packet according to the present invention.

According to other preferred embodiments of the present invention, and as specifically described with regard to FIG. 6, the EMM information, such as the service identifier(s), is transmitted in a packet having a particular structure. This packet is then more preferably filtered by end-user client 240 and/or verification module 300 (see FIG. 3) in order to determine if the EMM information is relevant to the particular end user device 210 before the EMM packet is delivered to security module 220 of that end user device 210. Such filtration is preferred in order to avoid overwhelming security module 220 with a huge amount of non-relevant EMM information.

In order to assist end-user client 240 to rapidly filter EMM packets, optionally and more preferably such packets have the structure shown in FIG. 6. As shown, an exemplary EMM packet format is described with regard to implementation as an IP/UDP packet. The packet features an IP header 600 and a UDP header 610. Next, at least one, and preferably a plurality of EMM 620 are included. Each EMM 620 optionally and more preferably features a filter type 630, which may be unique, group or general. Filter type 630 determines whether each EMM is allocated to a single IP address for a particular end user/subscriber (unique), all IP addresses (general) or a group of IP addresses (group). For both group and general addresses, the EMM may optionally be sent on a fixed multicast IP address, which could then be distributed based on regions in order to optimize EMM delivery performance and client performance. Such a multicast IP address may optionally be configured according to MADCAP (Multicast Address Dynamic Client Allocation Protocol) for example. Filter type 630 may also optionally and more preferably contain information related to a particular characteristic or characteristics which are stored on security module 220, such as a smart card for example, and/or are otherwise stored on, or accessible to, end-user client 240 (both not shown; see FIG. 3). One non-limiting example of such a characteristic would be an identifier for security module 220 itself, such as a smart card identifier for example.

Similarly, after each filter type 630, an address 640 contains information as to whether the EMM is unique, group or general in type. A length field 650 is then used, after which an EMM payload 660 contains the actual EMM information. This packet structure is one example of a format which may be optionally implemented for greater ease of filtering by end-user client 240.

EMMs may also optionally and alternatively or additionally be sent by e-mail as e-mail messages over the SNMP (simple network message protocol) protocol, such that end-user client 240 and/or end user device 210 could then optionally retrieve the EMMs as e-mail messages, for example at the initialization of operation of end user device 210 for each session.

Figure 7:
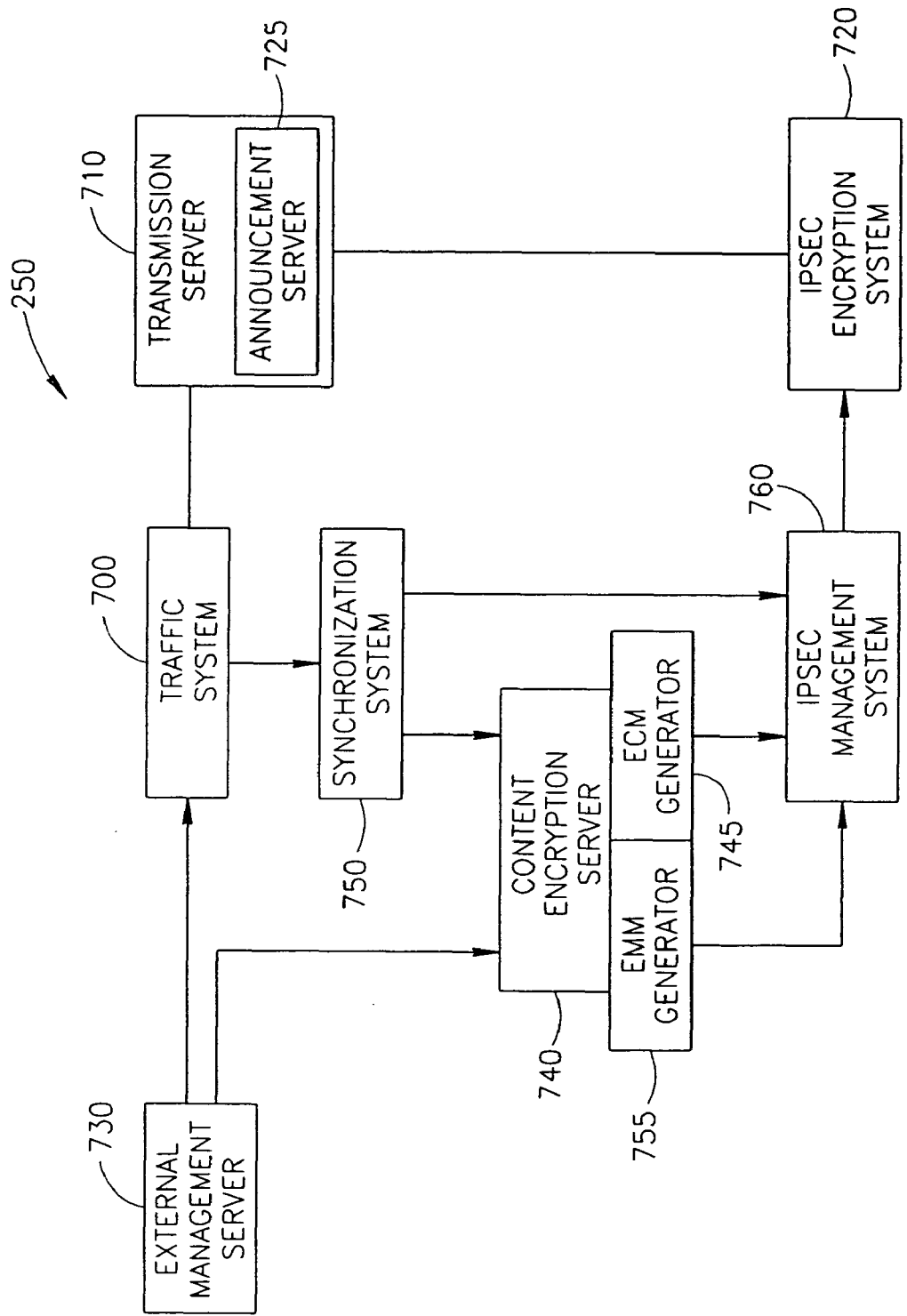
FIG. 7 shows an exemplary but preferred implementation of the broadcaster headend of FIG. 3 in greater detail according to the present invention.

FIG. 7 shows a schematic block diagram of a preferred embodiment of broadcaster headend 250. As shown, broadcaster headend 250 optionally and preferably features a plurality of components for performing encryption of the media content, and for synchronizing transmission of encrypted or otherwise protected media content and the corresponding security information and/or access schemes for determining access to the protected media content. A traffic system 700 receives information about the media content, metadata and schedules of new IP sessions. Traffic system 700 also preferably ensures that sufficient bandwidth is available on channel 205 (not shown) and/or within broadcaster headend 250 before scheduling IP sessions. In addition, traffic system 700 optionally and more preferably determines if the media content is within an authorized size range. If sufficient bandwidth is available and/or if other criteria are met, then traffic system 700 preferably generates the appropriate access criteria for being included in the ECM, and configures the system-wide security association parameters, which are required for enabling end user device 210 to eventually obtain access to the protected media content. Examples of access criteria include but are not limited to, price (particularly for the previously described pay-per-view system), parental rating and "blackout" criteria, which are criteria for determining whether a particular end user device 210 may not be granted access to the associated content. Traffic system 700 may optionally be implemented as a traditional television traffic system or data content provider system. In the latter type of system, the content provider has remote access to the system in order to define and schedule multicast sessions asynchronously as desired.

Once traffic system 700 has scheduled the new IP session, with the appropriate security parameters, information about the IP session is preferably passed to a transmission server 710. Transmission server 710 preferably announces each IP session and transmits the content to the appropriate IP address and UDP port of end user device 210 according to the schedule which is determined by traffic system 700. The media content and associate security information is then preferably passed to an IPSEC encryption system 720 for encryption and packaging into packets ("packetization") as described in greater detail below.

Transmission server 710 itself optionally and more preferably also features a separate announcement server 725 for creating and transmitting announcement messages, for example according to the SDP standard as previously described. Announcement server 725 preferably receives information from traffic system 700 concerning the schedule for the IP session, addresses of content and an ECM address pair (IP address and client port address), as well as the identifier for the ECM itself. The announcement message preferably includes all of these different types of information, and is preferably transmitted on a well known port address, although the session itself may optionally be conducted on different client ports. The address for the announcement may itself optionally be transmitted to each end user device 210 (not shown) automatically through standard digital video broadcast (DVB) streams such as the program specific information (PSI) and/or programming mapping table (PMT) streams, or the service information (SI) or service definition table (SDT) streams.

Turning back to traffic system 700, the information concerning the media content to be transmitted, the identity of the recipient end user devices 210, optionally subscriber information and other types of information are preferably sent from an external management server 730, which manages and configures separate network entities. Examples of such entities include, but are not limited to, subscribers, addresses, access criteria and bandwidth. External management server 730 also passes the necessary information to, and manages the activities of, a content encryption server 740, which may optionally operate according to any standard encryption method, including but not limited to, AES (advanced encryption standard), and DES.

Content encryption server 740 is also optionally and preferably in communication with a synchronization system 750. Synchronization system 750 preferably synchronizes the transmission of announcement messages, media content and ECMs, after receiving information about the IP sessions from traffic system 700. The transmission of EMMs is not necessarily synchronized with the transmission of these other messages, as long as the service identifier(s) are transmitted in a timely manner before the ECM is to be received and/or used. Furthermore, an EMM is not necessarily transmitted at all, such as for the optional "pay per view" mechanism, which as previously described does not require EMMs for operation. Synchronization system 750 also more preferably assigns all system addresses, including IP and port addresses.

Once the session has been scheduled, the security information has been selected (including at least one ECM for encrypting the media content), and the content has been synchronized with the security information, content encryption server 740 then encrypts the actual media content itself More preferably, the media content is encrypted with the key which would be generated from the ECM, as received by the end user device (not shown; see FIG. 3). Optionally and most preferably, content encryption server 740 contains an ECM generator 745 for generating the security information. ECM generator 745 generates a control word for actually encrypting the media content.

The same control word must then be generated again at the end user device (not shown) in order for the media content to be accessed and displayed. The ECM itself must also be generated from at least the control word, and more preferably also from access criteria, concerning those end user devices (not shown) which are allowed to have access to the media content. However, the present invention is not limited to this type of mechanism, but may also include implementations in which ECM generator 745 does not generate the control word, which is instead generated separately by a separate control word generating module (not shown). For the latter type of implementation, preferably ECM generator 745 generates the ECM from a combination of the control word and access information.

Next, ECM generator 745 preferably schedules transmission of the corresponding ECM and transmits the ECM when ready. Also, ECM generator 745 optionally and preferably inserts the SPI within the packet containing the ECM information, as previously described. If the SPI is used, then ECM generator 745 also optionally and preferably increments the SPI counter at each key period change, also as previously described.

A corresponding service identifier is preferably determined (as one type of access criteria) for association with an ECM, in order to be able to inform the end user devices as to whether they are authorized to use the ECM. The EMM information (service identifier) is preferably placed in a EMM by a separate EMM generator 755. The EMM information is optionally sent on a fixed multicast IP address and port to the end user devices.

The encrypted content is then passed to an IPSEC management system 760, which manages the process of forming packets and including the IPSEC encryption information at IPSEC encryption system 720. IPSEC management system 760 more preferably manages the security policy database and the security association database based upon input received from synchronization system 750 and content encryption server 740. IPSEC management system 760 optionally and preferably stores information in the security association database concerning the type of encapsulation protocol for creating the packets, such as ESP for example as previously described; the type of encryption method which is used for encrypting the actual media content, such as RC4, DES or 3DES, for example; the type of IP mode for transmitting the packet, such as transport mode for example; and information about the initialization vector (IV) if in fact one such vector exists.

IPSEC management system 760 also preferably merges the control word, security association parameters and SPI information with IP multiplexing information.

IPSEC encryption system 720 preferably performs two functions: encryption according to the IPSEC standards, and packet formation. The packets are formed by receiving the incoming encrypted content and associated information, according to the IPSEC standards as previously described. More preferably, the packets are formed by adding the ESP header with the appropriate SPI to the encrypted content, after which the packets are transmitted. Optionally and more preferably, packets containing security information such as ECMs and EMMs, and also announcement messages, are forwarded for distribution through the IP network without being transformed into packets by IPSEC encryption system 720. IPSEC encryption system 720 then performs encryption of the packet contents as required.

According to optional but preferred embodiments of the present invention, the previously described management and encryption system may be optionally implemented with Simulcrypt protocols. These protocols enable an IPSEC-enabled encryptor, such as IPSEC encryption system 720 for example, to encrypt the IP content (streams or files) once based on a unique key (or control word) generated by a local key generator. This key may then optionally be sent over standard Simulcrypt protocols to multiple separate ECM generators of separate CA (content access) systems to enable secure ECM delivery across these different content access systems. In other words, with one encrypted content stream and/or file and one key or control word, multiple ECMs may be possible.

Figure 8:
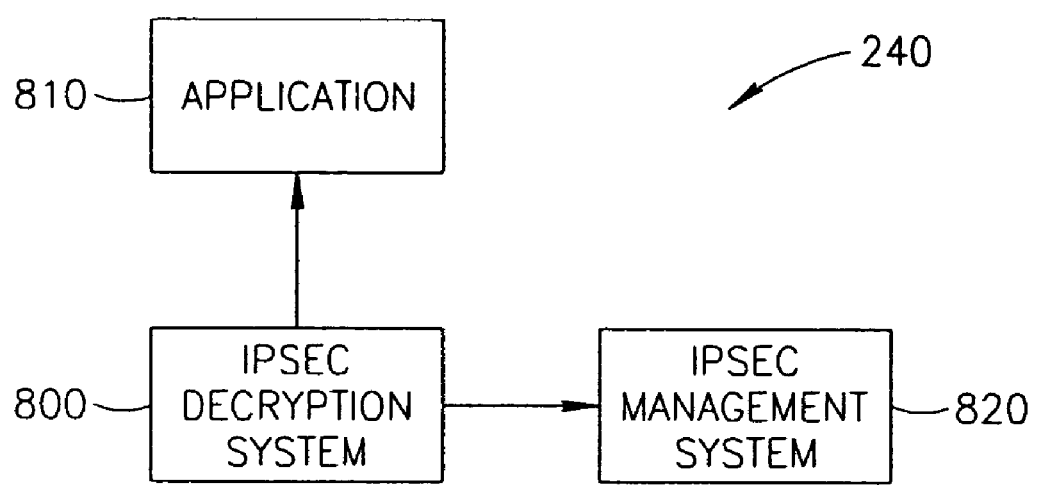
FIG. 8 shows an exemplary but preferred implementation of the end-user client of FIG. 3 in greater detail according to the present invention.

FIG. 8 shows an exemplary but preferred implementation of end-user client 240 in greater detail. As shown, end-user client 240 preferably features an IPSEC decryption system 800 for receiving all packet data, which is preferably IP data, and also for decrypting such data if necessary. IPSEC decryption system 800 is preferably able to retrieve the necessary SPI and other security related information, in order to decrypt the packet data.

The decrypted data is then passed to an application 810 which has requested this data. Each application 810 preferably acts as a trigger for receiving more data, by opening a socket and receiving content from IPSEC decryption system 800.

IPSEC decryption system 800 also preferably communicates with an IPSEC management system 820 for implementing the security policy database and security association database, for storing the necessary security information. Such information is optionally stored in client database 260 (not shown; see FIG. 3). IPSEC management system 820 preferably manages EMM information and other security information as well, including, but not limited to, source IP and source port addresses; destination IP and port addresses; SPI, control word and IP multiplexing information. IP multiplexing information may include such information as the type of encryption algorithm, initialization vector, transport or tunnel mode, and so forth. All of these components are preferably in communication with security module 220 and/or verification module 300 (not shown; see FIG. 3). Optionally, IPSEC management system 820 also manages the functions of security module 220 as well.

One optional embodiment for the present invention involves membership revocation for an end user device which has left a group, involving revocation of authorization for service identifiers and/or limiting the key period for the service identifiers. The remaining group members then require reauthorization, although with short key periods, such reauthorization would be frequently performed without a special procedure. It is even possible to make a reauthorization necessary within a multi-cast session. The local security module could optionally prevent access to the service identifiers and/or other authorization information. As an example, a system of rules for this usage of service identifiers is optionally and preferably determined at the broadcaster headend, and then transmitted to the smartcard (security module). Revocation is optionally performed by sending information with an EMM, although alternatively or additionally, revocation is preferably performed with an ECM. For example, revocation is optionally performed by sending an EMM hidden within an ECM, thereby causing the smart card or other local security module to obtain or lose authorization, according to the desired outcome.

The method of the present invention also avoids another major loophole and problem for multicast security, with regard to key sharing conspiracies. In the standard model in the background art, the keys can be shared quite easily, since they tend to last a long time. In the present invention, the keys (control words) are preferably changed very often according to a relatively short key period, so sharing is more difficult, certainly for streaming data. This solution also prevents the reuse of old keys and/or old content, since any current key is then preferably unable to decrypt previous or future transmissions of content. Standard models for multicast in the background art do not deal with this problem efficiently.

The previous discussion has clearly demonstrated the utility of the present invention in a broadcaster-controlled network environment, in which one broadcaster transmits data to a plurality of end user devices simultaneously through a network, particularly a packet-based network in a non-reliable environment or at least an environment in which reliability is not guaranteed, such as the Internet or other IP network. Other security mechanisms have been developed for such network environments, but they have not been shown to be useful for broadcast data, as they are concerned with security for a session between two parties.

As an example, the SSL (secure sockets layer) protocol may be considered. SSL is clearly only useful for secure, reliable communication between two hosts through a network, unlike the present invention, such that SSL is not only not intended for multicasting, but in fact is not usable for multicasting. SSL also relies upon a trusted certificate authority; once both parties have received such certificates, they mutually trust each other completely. By contrast, the present invention requires continuous or at least repeated authentication of the end user device, thereby preventing an unauthorized user from gaining initial access and then continuing to receive services from the broadcaster. Also, SSL only supports the TCP/IP connection protocol, but does not operate over the UDP connectionless protocol, while the method of the present invention works with both the connection and connectionless protocols. Thus, SSL is not scalable to a large number of end user devices, while the present invention is scalable to such a large number of end user devices.

According to another preferred embodiment of the present invention, there is provided a mechanism for transferring content through a "peer-to-peer" system. The term "peer-to-peer" refers to the transfer of data, such as the content and/or associated security information, between end user devices. This preferred embodiment may be used to reduce the load on the central server or other central authorization entity.

There are various scenarios that are possible in order to manage peer-to-peer sessions. The simplest model preferably features a security server at each peer end user device. The security server could optionally be implemented with any platform which is capable of secure storage and secret cryptographic calculations, whether in protected hardware or software. One non-limiting example of such a platform is a smart card with a smart card reader. Each such security server would be capable of all the procedures previously described as occurring in the host, at the broadcaster/broadcaster headend in FIG. 3, for example. Each host can optionally and preferably generate its own list of service identifiers and Control Words or another type of key to be used to authorize any other peer end user device (or set of hosts), and to encrypt communications.

Authorizations are more preferably performed with locally generated EMMs signed by the local security server, while data is more preferably encrypted by the local security server. SDP announcements would be generated locally and digitally signed to authenticate the session call. One potential drawback of this mechanism is the significant potential for collisions for all elements, particularly with regard to service identifiers. Therefore, as a preferred feature, for all sessions with a membership group of peer devices, each local host would optionally and preferably coordinate through a central host, a Group Controller. This coordination could optionally occur in advance of a specific session; for example, each new local host which becomes a member is then assigned a range of service identifiers, for example. Alternatively, this coordination could optionally be performed through the packet-based network in "real time", such that before or at the start of each session, the local host would request an identifier from the Group Controller (GC). This GC is preferably not a classic Group Controller as defined in the discussions above, but would have a very limited function of coordination, with minimal overhead.

Once recourse is made to Group Controller involvement in peer to peer interactions, a model may optionally and more preferably be implemented in which the Group Controller plays an even more significant role in the peer to peer session. In addition to the coordination and assignment of service identifiers, the Group Controller may also optionally schedule all synchronization requirements for the system including announcements and access criteria generation. Optionally and most preferably, the GC generates the ECMs to be transmitted, while locally generating the CW (control word; used for local creation of the control word as previously described).

For local hosts that are very limited in terms of computational power and/or bandwidth, the model is optionally altered to enable all elements to be generated and/or coordinated by the GC including data encryption and CW generation, apart from the setup parameters, which are defined by the local hosts.

An intermediate version of the above model preferably features a general broadcaster headend (as for FIG. 3, for example) to register a session and to generate a steady flow of CW to encrypt and decrypt peer to peer sessions. Such a model may be preferably implemented if the local headend is not considered secure enough to have a CW generator on-site, particularly in cases where the CW generator is implemented in software. For this model, each EMM carrying service identifiers is supplied by the central, general headend upon registration, but alternatively may be generated by each peer for another peer.

Any suitable combination of the above features is considered to be within the scope of the present invention, and may optionally be implemented as practicable depending upon the needs of the specific session, and the capabilities of the hosts.

An additional, optional configuration of the peer to peer model would be a variation on the tree model of distribution (and authentication) by using a cluster model. The cluster would preferably have special attributes, where any given peer would reside in a cluster, and a specific topology of other peers would be established for each session (like a flat tree model), such that any change to that topology would affect some change in either authentication or distribution. For example, other peer devices would optionally and preferably be allowed to introduce new peer devices to the topology. This model could be effective in supporting various superdistribution models, for example where there are business rules that allow the redistribution of content from receivers of that content, under certain specified conditions.

Such a model could optionally be specifically implemented according to the preferred embodiments of the present invention by enabling a local peer device, which has been authorized by an EMM for a specific service identifier, to send a new EMM for authorizing another host for that service identifier. If tighter control is desired, then another service identifier is most preferably required, which would then be reported back to the originating service provider (such as the broadcaster of FIG. 3, for example), which is an example of a central authorization entity. The central authorization entity preferably at least coordinates the cluster, and more preferably continuously validates the cluster.

Once the new service identifier is received, the provider could then add this service identifier to the list that becomes included in the ECM for decryption access. This avoids passing control of the new peer device from the interested peer device to a central authorizing authority, without involving any need to decrypt and re-encrypt at the local host level.

Based on the previous model, local clusters of peer devices could optionally generate specific groups of requests to the central server which then arbitrates sessions to other clusters of such peer devices.

Alternatively or additionally, the local peer device is preferably able to receive an ECM, use the control word to encrypt local content (through the security module such as the smart card) and then transmit such encrypted content to other peer devices. Alternatively, if the peer device is not able to perform encryption locally, or if the data is such that it does not require encryption, the generated control word could optionally still be used as a basis (or seed) for a hashed signature scheme, for example by using the smart card for generating the signature.

However, the requirement for a certain level of computational ability of the peer device is a feature of these preferred embodiments. For example, if the peer devices are required to generate announcements, such as SPI messages, and/or EMMs, as well as to deliver content, a certain amount of buffer space is required to store all incoming CWs and SPI messages for decrypting. The generation of ECMs is most preferably kept at a central ECM generator, both for security reasons and to reduce the computational load on the peer devices.

Optionally and more preferably, peer devices are distinguished with different levels of authorization and/or abilities. For example, some peer devices can view and write to all other devices, while some such devices can only view or write to certain devices, etc. Optionally, some peer devices may only be allowed to transmit content based upon the type of service identifier.

According to other optional but preferred embodiments of the present invention, EMMs are delivered out of band (that is, separately from the content). For example, EMMs could optionally and preferably be delivered through encrypted (or open) e-mail messages. Using IETF standards such as Privacy Enhanced Mail (PEM) or MME Object Security Services, or non-IETF PGP (Pretty Good Privacy). Unfortunately, delivery by e-mail messages again raises the issue of scalability. If the email message should be secured, then finding and using public keys is a problem. Such keys could optionally be cached locally or obtained from a public directory, although this may cause the processing overhead to become very high with a very slow distribution. Thus, preferably this mechanism is not used for key distribution, but only for EMM distribution, which could optionally be performed without encryption, such that only authentication signatures are preferably required, as a replacement for e-mail message invitations to multi-cast sessions.

According to other optional embodiments of the present invention, particularly with regard to peer-to-peer distribution of content, content is authenticated by authenticating the source. For example, a signature or other secret information could optionally be added for this purpose, such as an identifier for the source device (such as the source security module), and/or a public key signature. Preferably, however, the signature or other secret information is used as a seed to a simple hash function, which then enables the end user device to rapidly authenticate the source of the information.

While the invention has been described with respect to a limited number of embodiments, it will be appreciated that many variations, modifications and other applications of the invention may be made.

What is claimed is:

1. A method for securely multicasting media content to a plurality of end user devices without requiring one-to-one key exchange the method comprising:
    encrypting at least part of the media content with a key to form encrypted packets, the key being at least partially generable from key generation information, the key generation information and the key being changed according to a key period;
    multicasting the key generation information to the end user devices through an Internet Protocol packet-based network, the key generation information including first address information;
    multicasting the encrypted packets to the end user devices through the Internet Protocol packet-based network, the encrypted packets including second address information;
    creating an announcement including the second address information of the encrypted packets and the first address information of the key generation information; and
    transmitting the announcement to the end user devices wherein the end-user devices are operative to matching between the encrypted packets and the key generation information based on the first and second address information included in the announcement,
    wherein the transmitting and the multicasting takes place in the Internet Protocol packet-based network, the Internet Protocol packet-based network being secured according to an Internet protocol security standard, the announcement being created and transmitted according to an announcement protocol of the Internet protocol security standard.

2. The method of claim 1, wherein said key generation information includes control word information for key generation at each end user device.

3. The method of claim 2, wherein an ECM (entitlement control message) is sent to said end user devices for said key generation information for said key generation, such that said ECM contains said control word information for said key generation.

4. The method of claim 3, wherein said ECM is multi-cast to said end user devices, and wherein an EMM (entitlement control message) is also transmitted to said end user devices, such that EMM information contained in said EMM is required for said end user device to access said ECM.

5. The method of claim 4, wherein said EMM is transmitted to said end user devices by an out-of-band message, such that said EMM is not transmitted with said encrypted packets.

6. The method of claim 5, wherein said out-of-band message is an e-mail (electronic mail) message.

7. The method of claim 4, wherein said ECM is transmitted through said IP network according to at least one of a multi-cast IP address and an IP port, such that said end user device is notified of said at least one of said multicast IP address and said IP port through the announcement protocol.

8. The method of claim 4, wherein said end user device filters at least one of said ECM and said EMM according to at least one characteristic selected from the group consisting of a characteristic of said end user device and a characteristic of information stored by said end user device.

9. The method of claim 8, wherein said end user device filters said ECM according to EMM information, such that only an ECM for which EMM information has been received is accessed by said end user device.

10. The method of claim 9, wherein said ECM is contained in a packet, and an IP address for said packet is announced to said end user device, such that said end user device filters said ECM by listening to said IP address for receiving said packet if said end user device has received said EMM information.

11. The method of claim 8, wherein said end user device filters at least one of said ECM and said EMM according to whether said at least one of said ECM and said EMM is designated as unique, group or general.

12. The method of claim 4, wherein said EMM information includes a service identifier, and wherein said service identifier is related to a type of content of said encrypted packets.

13. The method of claim 12, wherein said encrypted packets contain a plurality of different types of content, each type of content having a separate service identifier, such that differential access to said different types of content by said end user device is provided according to said service identifiers.

14. The method of claim 12, wherein said service identifier corresponds to a plurality of ECMs.

15. The method of claim 4, wherein said EMM information includes an identifier for determining access to said encrypted packets according to at least one characteristic selected from the group consisting of a characteristic of an end user device and a characteristic of information stored on said end user device.

16. The method of claim 15, wherein said identifier is a blackout identifier for identifying an end user device blocked from accessing a content of said ECM.

17. The method of claim 16, wherein said blackout identifier corresponds to at least one characteristic stored in said end user device.

18. The method of claim 17, wherein said at least one characteristic includes a geographical location of said end user device.

19. The method of claim 4, wherein said ECM enables differential access to said encrypted packets by said end user device according to a plurality of identifiers transmitted in said EMM.

20. The method of claim 4, wherein said end user device stores at least a content of at least one of said ECM and said EMM.

21. The method of claim 20, wherein said ECM has a limited key period, such that a new ECM is periodically received to access said encrypted packets.

22. The method of claim 21, wherein a length of said key period is at least partially determined by a length of a session for receiving said encrypted packets by said end user device.

23. The method of claim 22, wherein said length of said key period is less than said length of said session, such that at least one of a new ECM and a new EMM must be received repeatedly during said session.

24. The method of claim 23, wherein said EMM has a limited authorization period, such that a new EMM is periodically received to access said encrypted packets.

25. The method of claim 3, wherein at least a portion of said encrypted packets are accessible with said ECM only, without said EMM, as a preview of said encrypted packets.

26. The method of claim 4, wherein said packets are transmitted as part of a multi-cast session, and wherein an announcement for said session is transmitted according to the announcement protocol.

27. The method of claim 4, wherein said standard IP protocol is IPSEC.

28. The method of claim 27, wherein said announcement includes information for relating each ECM to a service identifier contained in an EMM.

29. The method of claim 28, wherein said announcement protocol is SDP (session description protocol).

30. The method of claim 28, wherein said ECM is associated with at least a portion of a multi-cast session with said end user device, and wherein said association is transmitted in said encrypted packets as an attribute parameter.

31. The method of claim 30, wherein said ECM is synchronized with said encrypted packets with an SPI (security parameters index) value of said encrypted packets.

32. The method of claim 31, wherein a new key period is indicated by a change in said SPI value, such that a new ECM is required to access said encrypted packets.

33. The method of claim 26, wherein the announcement is encrypted.

34. The method of claim 15, wherein said end user device is blocked from further access to said encrypted packets through revocation with at least one of an EMM and an ECM.

35. The method of claim 34, wherein said revocation is for a specific end user device.

36. The method of claim 35, wherein said revocation is for a plurality of end user devices.

37. The method of claim 34, wherein said revocation causes a new service identifier to be required for accessing a content of an ECM corresponding to said encrypted packets.

38. The method of claim 4, wherein said end user devices receive at least said encrypted packets from at least one peer end user device.

39. The method of claim 38, wherein said at least one peer end user device generates at least one of said EMM and said ECM.

40. The method of claim 39, wherein said at least one peer end user device includes a secure server for generating said least one of said EMM and said ECM.

41. The method of claim 39, wherein said EMM generated by said at least one peer end user device is authenticated by a central authorization entity.

42. The method of claim 39, wherein said EMM generated by said at least one peer end user device is mapped to a new ECM for accessing said encrypted packets by a central authorization entity.

43. The method of claim 39, wherein said packets are transmitted as part of a multi-cast session, an announcement for said session is transmitted according to the announcement protocol, and said announcement includes at least an SPI (security parameters index) for relating each ECM to a service identifier contained in an EMM, such that said at least one peer end user device generates at least one of said announcement and said SPI.

44. The method of claim 32, wherein said central authorization entity controls at least one of said ECM, said EMM, said announcement and said SPI.

45. The method of claim 32, wherein at least one of said EMM and said ECM is generated by said central authorization entity.

46. The method of claim 32, wherein said end user devices are located in a cluster, and wherein each cluster is coordinated by said central authorization entity.

47. The method of claim 46, wherein said cluster is continuously validated by said central authorization entity.

48. The method of claim 3, wherein a pay-per-view ECM contains purchasing information for purchasing access to said encrypted packets and wherein EMM information is not required to access said pay-per-view ECM.

49. The method of claim 3, wherein an EMM contains a credit for purchasing access to said encrypted packets for pay-per-view content.

50. The method of claim 28, wherein said announcement protocol is SAP (session announcement protocol) of IETF.

51. The method of claim 28, wherein said announcement protocol is CDF (Channel Definition Format).

52. The method of claim 28, wherein said announcement protocol is an XML based announcement protocol.

53. The method of claim 28, wherein said announcement protocol is ESP protocol.

54. The method according to claim 1, wherein a change of the key period is announced by an SPI (security parameters index) in a security information message according to ESP (IP encapsulating security payload) protocol.

55. A method for securely receiving media content at an end user device without requiring one-to-one key exchange, the method comprising:
receiving key generation information in an end user device through an Internet Protocol packet-based network, at least some of the key generation information including first address information, the key generation information being changed according to a key period;

receiving a plurality of encrypted packets in the end user device through the Internet Protocol packet-based network, at least some of the encrypted packets including second address information;

receiving an announcement in the end user device, the announcement including the second address information of the at least some encrypted packets and the first address information of the at least some key generation information;

matching between the at least some encrypted packets and the at least some key generation information based on the first and second address information included in the announcement, wherein the receiving takes place via the Internet Protocol packet-based network, the Internet Protocol packet-based network being secured according to an Internet protocol security standard, the announcement being created and transmitted according to an announcement protocol of the Internet protocol security standard.

56. The method of claim 55, wherein an ECM (entitlement control message) is received at the end user device, the ECM including the control word information.

57. The method of claim 56, wherein an EMM (entitlement control message) is received at the end user device, such that EMM information contained in the EMM is required for the end user device to access the ECM.

58. The method of claim 57, wherein the ECM is received via the IP network according to at least one of a multicast IP address and an IP port, such that the end user device is notified of the at least one of the multicast IP address and the IP port through the announcement protocol.

59. The method of claim 57, wherein the standard IP protocol is IPSEC.

60. The method of claim 59, wherein the announcement includes information for relating each ECM to a service identifier contained in an EMM.

61. The method of claim 60, wherein the announcement protocol is SDP (session description protocol).

62. The method of claim 60, wherein the ECM is associated with at least a portion of a multi-cast session with the end user device, and wherein the association is transmitted in the encrypted packets as an attribute parameter.

63. The method of claim 62, wherein the ECM is synchronized with the encrypted packets with an SPI (security parameters index) value of the encrypted packets.

64. The method of claim 63, wherein a new key period is indicated by a change in the SPI value, such that a new ECM is required to access the encrypted packets.

65. The method of claim 55, further comprising generating a key based on the at least some key generation information.

66. The method of claim 55, further comprising decrypting the at least some encrypted packets with the key.

* * * * *